(12) United States Patent
Morrison et al.

(10) Patent No.: US 11,809,639 B2
(45) Date of Patent: Nov. 7, 2023

(54) PEDESTRIAN SENSOR ACCURACY WITH MINIMAL DEPENDENCE ON MAGNETOMETER

(71) Applicant: QUALCOMM Incorporated, San Diego, CA (US)

(72) Inventors: William Morrison, San Francisco, CA (US); Hsiao Chien Liang, San Jose, CA (US); Gautam Nirula, San Jose, CA (US); Himanshu Shah, Milpitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 15 days.

(21) Appl. No.: 17/489,190

(22) Filed: Sep. 29, 2021

(65) Prior Publication Data

US 2023/0107423 A1   Apr. 6, 2023

(51) Int. Cl.
  *G06F 3/0346*   (2013.01)
  *G01C 25/00*   (2006.01)
  *G06F 3/038*   (2013.01)

(52) U.S. Cl.
  CPC ......... *G06F 3/0346* (2013.01); *G01C 25/005* (2013.01); *G06F 3/038* (2013.01)

(58) Field of Classification Search
  CPC ...... G06F 3/0346; G06F 3/038; G01C 25/005
  See application file for complete search history.

(56) References Cited

U.S. PATENT DOCUMENTS 5,297,028 A * 3/1994 Ishikawa ............... G01C 19/42
                                                             73/497
5,527,003 A * 6/1996 Diesel .................... G01C 21/16
                                                             244/76 R (Continued)

FOREIGN PATENT DOCUMENTS

EP   3076133 A1   10/2016
HK   2700908 A1   2/2014

OTHER PUBLICATIONS

International Search Report and Written Opinion—PCT/US2022/042880—ISA/EPO—dated Jan. 3, 2023.

*Primary Examiner* — Natalie Huls
*Assistant Examiner* — Cynthia L Davis
(74) *Attorney, Agent, or Firm* — Procopio, Cory, Hargreaves & Savitch LLP

(57) ABSTRACT

Aspects presented herein may enable an electronic device to determine gyroscope biases and calibrate a gyroscope without a magnetometer or without relying on data generated from a magnetometer. In one aspect, an apparatus estimates a set of gyroscopic biases for a plurality of temperatures or temperature ranges to create a mapping that maps the plurality of temperatures or temperature ranges to the set of gyroscopic biases. The apparatus monitors temperatures of a gyroscope via a gyroscope temperature sensor. The apparatus calibrates the gyroscope in response to the gyroscope changing from a first temperature to a second temperature based on the mapping or based on a predicted value derived from the mapping. In some aspects, the apparatus calculates a DR trajectory of the apparatus based at least in part on the calibrated gyroscope and the accelerometer without using a magnetometer or without using data generated from the magnetometer.

46 Claims, 16 Drawing Sheets

Example of magnetometer independent DR trajectory generated by the electronic device 502 (based on the same traveling path shown at 404 of FIG. 4)

(56) References Cited

U.S. PATENT DOCUMENTS

| | | | |
|---|---|---|---|
| 2007/0073482 A1* | 3/2007 | Churchill | G01C 21/165 |
| | | | 701/492 |
| 2008/0284650 A1* | 11/2008 | MacIntosh | A63B 69/10 |
| | | | 342/357.57 |
| 2009/0093984 A1* | 4/2009 | Choi | G01C 19/00 |
| | | | 901/1 |
| 2010/0039381 A1* | 2/2010 | Cretella, Jr | G06F 3/0485 |
| | | | 345/158 |
| 2010/0292943 A1 | 11/2010 | Minor et al. | |
| 2011/0178707 A1 | 7/2011 | Sachs et al. | |
| 2012/0220428 A1* | 8/2012 | Carlson | A63B 21/222 |
| | | | 482/8 |
| 2012/0239333 A1* | 9/2012 | Keene | G01C 22/006 |
| | | | 702/94 |
| 2013/0293416 A1* | 11/2013 | Waters | G01S 19/48 |
| | | | 342/357.31 |
| 2013/0345972 A1* | 12/2013 | Askarpour | G01C 21/165 |
| | | | 33/356 |
| 2015/0114082 A1* | 4/2015 | Blanchard | G01C 25/005 |
| | | | 73/1.77 |
| 2015/0260545 A1* | 9/2015 | Yang | G01C 25/005 |
| | | | 73/1.77 |
| 2017/0343349 A1* | 11/2017 | Han | G01C 19/56 |

\* cited by examiner

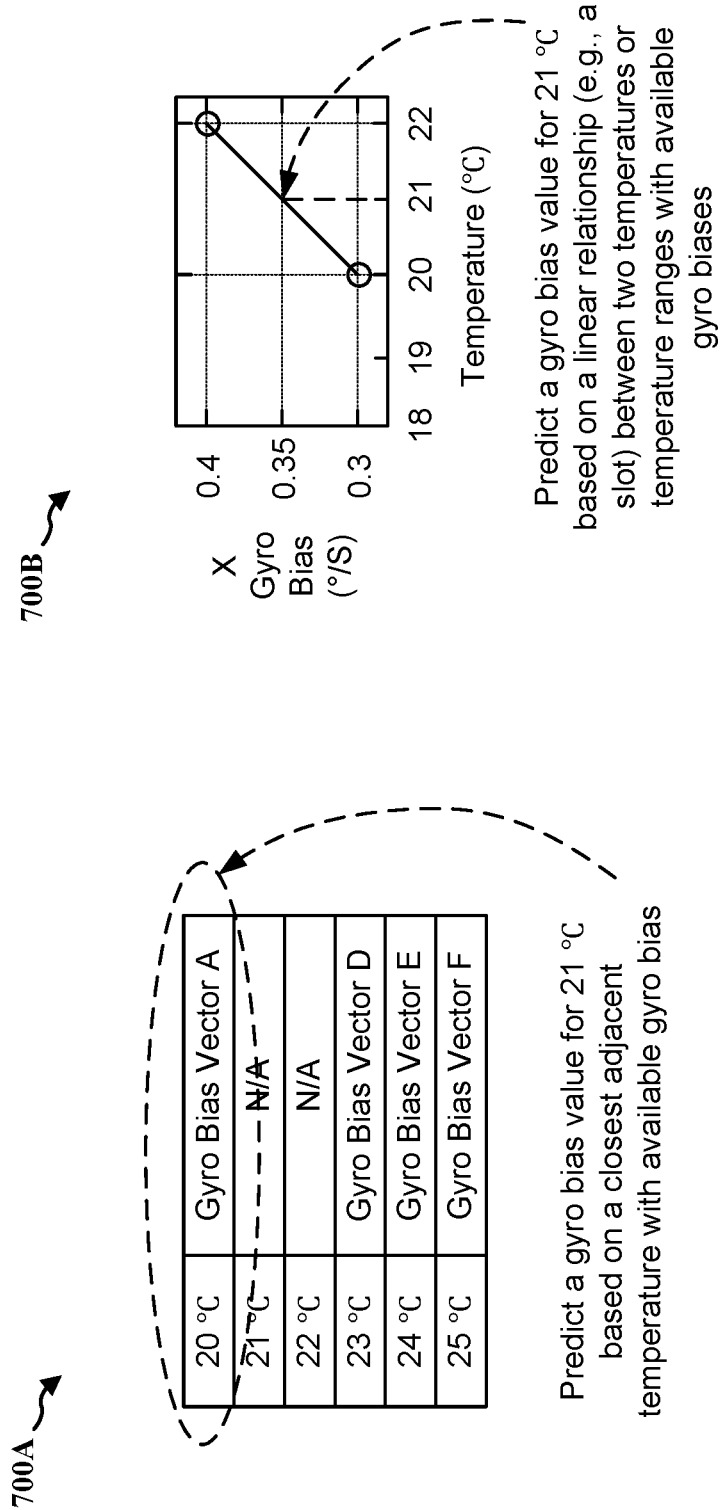

PEDESTRIAN SENSOR ACCURACY WITH MINIMAL DEPENDENCE ON MAGNETOMETER

TECHNICAL FIELD

The present disclosure relates generally to devices incorporating sensors, and more particularly, to devices including gyroscopic sensors.

INTRODUCTION

Over last few years, consumer electronic devices, such as smart phones, smart watches, game controllers, and/or tracking devices, have been equipped with various types of sensors. For example, an electronic device may include a magnetometer for sensing magnetic fields, a gyroscope for detecting and measuring the angular motion of the electronic device, and/or an accelerometer for detecting gravity as a static acceleration as well as dynamic acceleration of the electronic device, etc.

Manufacturers for electronic devices may calibrate sensors employed by their electronic devices at the time of device manufacturing or before the electronic devices are shipped to their customers, and the calibration of sensors during manufacturing may be referred to as a factory calibration. The factory calibration may be performed with high accuracy by utilizing special equipment, a controlled environment, and/or trained personnel. However, by the time the electronic devices are used by their customers, the sensor calibrations may be off due to a temperature change, different battery voltage, and other effects that are beyond control of the design engineers.

Applying proper calibration to the sensors of electronic devices may be important for the electronic devices. For example, sensors used in association with navigation, tracking and/or direction/speed determination may be specified to integrate over time. Without proper sensor calibrations, the sensing result from sensors may start to include errors that grow in time, and may eventually make the sensing results inaccurate and unacceptable. Thus, to ensure proper operations of the electronic devices, a corresponding software, algorithm, and/or hardware may be used for applying an autonomous calibration to one or more sensors in the electronic devices. As such, there exists a need for further improvements in sensor design and sensor calibration. These improvements may also be applicable to other sensing technologies and apparatuses that employ these technologies.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus estimates a set of gyroscopic biases for a plurality of temperatures or temperature ranges to create a mapping that maps the plurality of temperatures or temperature ranges to the set of gyroscopic biases. The apparatus monitors temperatures of a gyroscope via a gyroscope temperature sensor. The apparatus calibrates the gyroscope in response to the gyroscope changing from a first temperature to a second temperature based on the mapping or based on a predicted value derived from the mapping.

In another aspect of the disclosure, a method, a computer-readable medium, and an apparatus are provided. The apparatus calibrates a gyroscope in response to the gyroscope changing from a first temperature to a second temperature based on a mapping or based on a predicted value derived from the mapping. The apparatus identifies a gyroscope-based orientation of the apparatus without using a magnetometer-based orientation identified by a magnetometer. The apparatus calculates a DR trajectory of the apparatus based at least in part on the gyroscope-based orientation of the apparatus. The apparatus estimates a position of the apparatus based at least in part on the DR trajectory of the apparatus.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 7A is a diagram illustrating an example of predicting a gyro bias in accordance with various aspects of the present disclosure.

FIG. 7B is a diagram illustrating an example of predicting a gyro bias in accordance with various aspects of the present disclosure.

DETAILED DESCRIPTION

Figure 1:
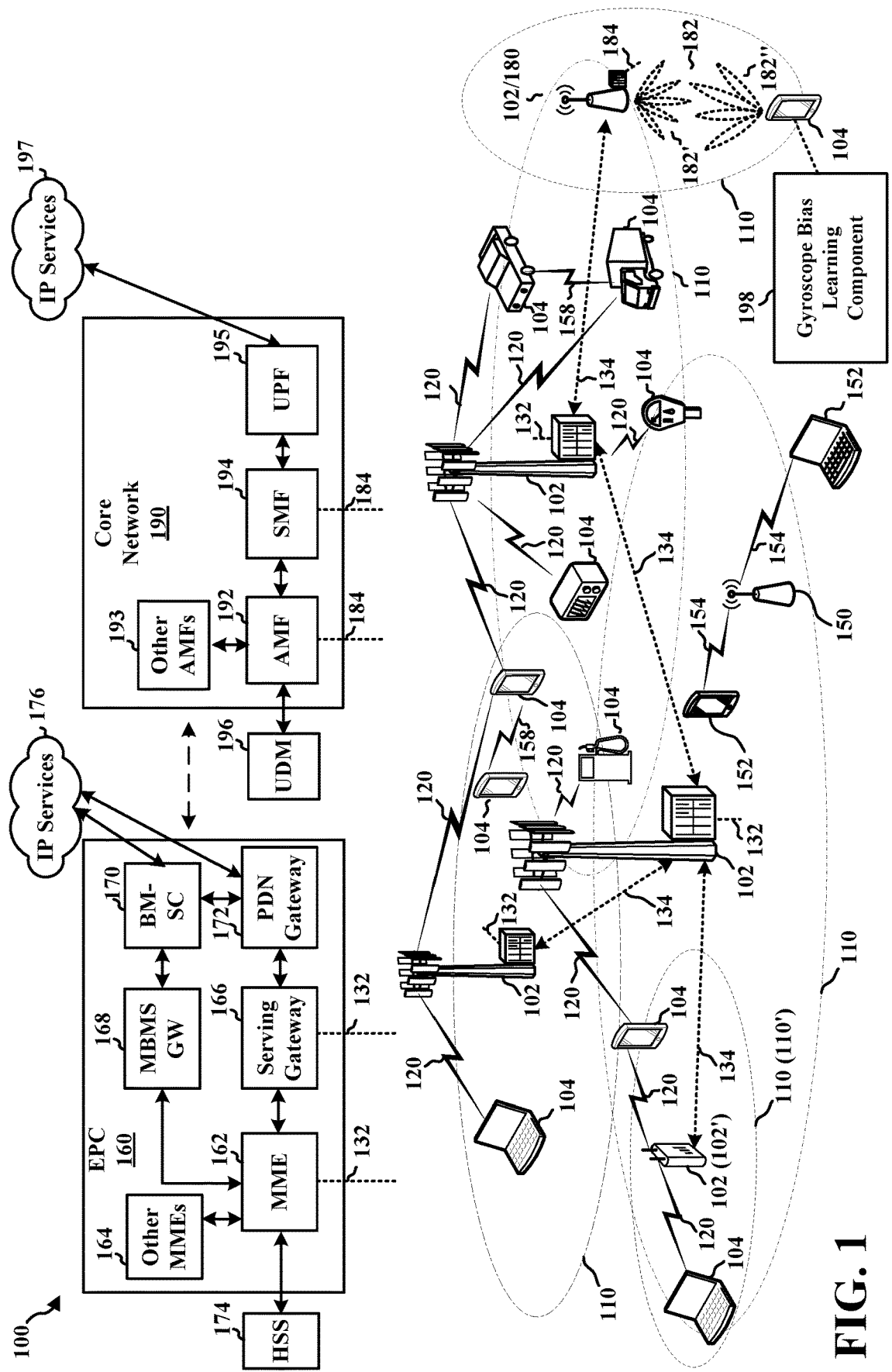
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

Aspects presented herein may enable an electronic device to determine gyroscope biases and calibrate a gyroscope without a magnetometer or without relying data generated from a magnetometer. As such, aspects presented herein may enable an electronic device, such as a user/pedestrian wearable device, to generate dead reckoning trajectories of the electronic device without a magnetometer and/or without relying data generated from a magnetometer. Thus, the dead reckoning trajectories generated by the electronic device may be less susceptible to magnetic field anomalies and the accuracy and precision of the dead reckoning trajectories generated may thereby be improved.

In certain aspects, the UE 104 may include a gyroscope bias learning component 198 configured to estimate or infer gyroscopic biases for the gyroscope at different temperatures or temperature ranges in a power efficient way. In one configuration, the gyroscope bias learning component 198 may be configured to estimate a set of gyroscopic biases for a plurality of temperatures or temperature ranges to create a mapping that maps the plurality of temperatures or temperature ranges to the set of gyroscopic biases. In such configuration, the gyroscope bias learning component 198 may monitor temperatures of a gyroscope via a gyroscope temperature sensor. In such configuration, the gyroscope bias learning component 198 may calibrate the gyroscope in response to the gyroscope changing from a first temperature to a second temperature based on the mapping or based on a predicted value derived from the mapping. In another configuration, the gyroscope bias learning component 198 may be configured to calibrate a gyroscope of an apparatus in response to the gyroscope changing from a first temperature to a second temperature based on a mapping or based on a predicted value derived from the mapping. In such configuration, the gyroscope bias learning component 198 may identify a gyroscope-based orientation of the apparatus without using a magnetometer-based orientation identified by the magnetometer. In such configuration, the gyroscope bias learning component 198 may calculate a DR trajectory of the apparatus based at least in part on the gyroscope-based orientation of the apparatus. In such configuration, the gyroscope bias learning component 198 may estimate a position of the apparatus based at least in part on the DR trajectory of the apparatus.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Figure 2A:
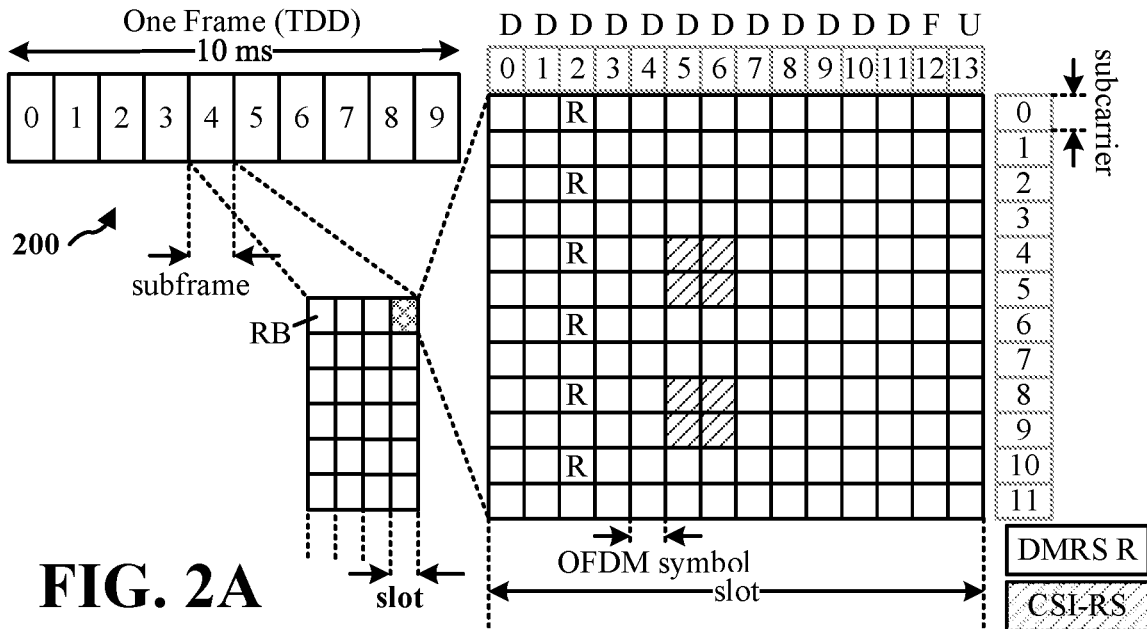
FIG. 2A is a diagram illustrating an example of a first frame, in accordance with various aspects of the present disclosure.
Figure 2B:
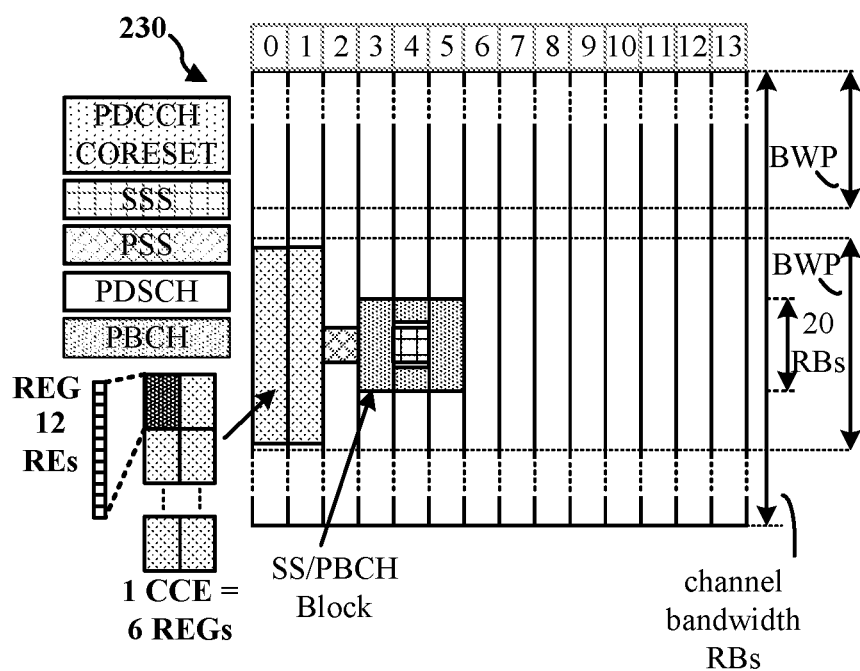
FIG. 2B is a diagram illustrating an example of DL channels within a subframe, in accordance with various aspects of the present disclosure.
Figure 2C:
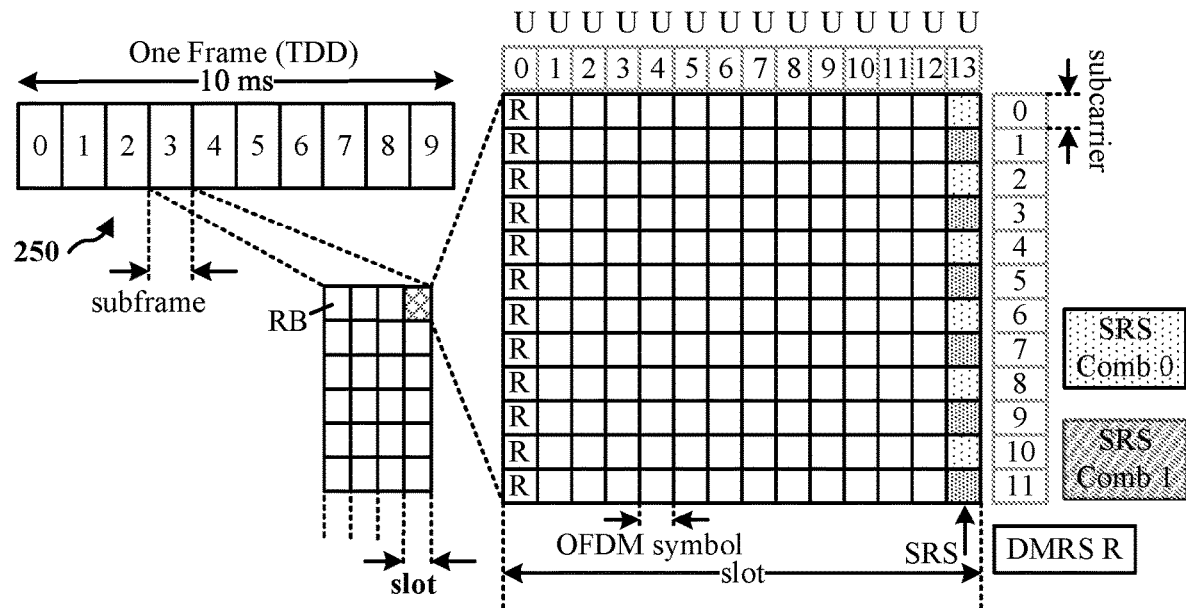
FIG. 2C is a diagram illustrating an example of a second frame, in accordance with various aspects of the present disclosure.
Figure 2D:
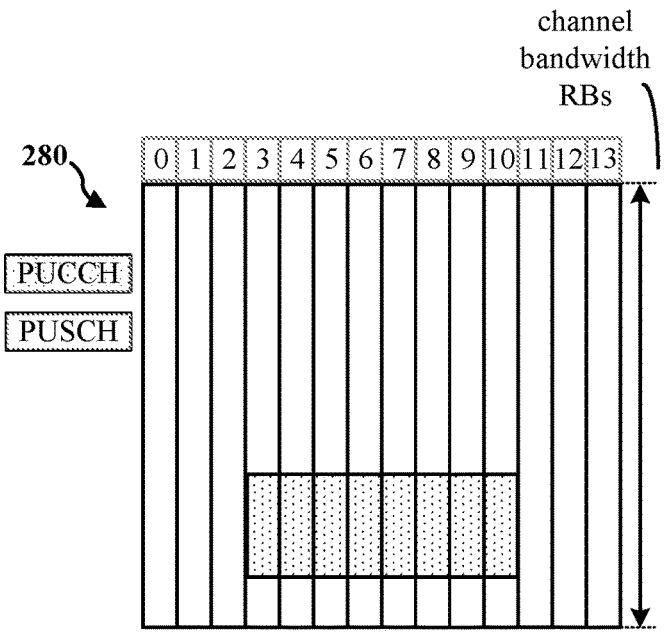
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu *15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
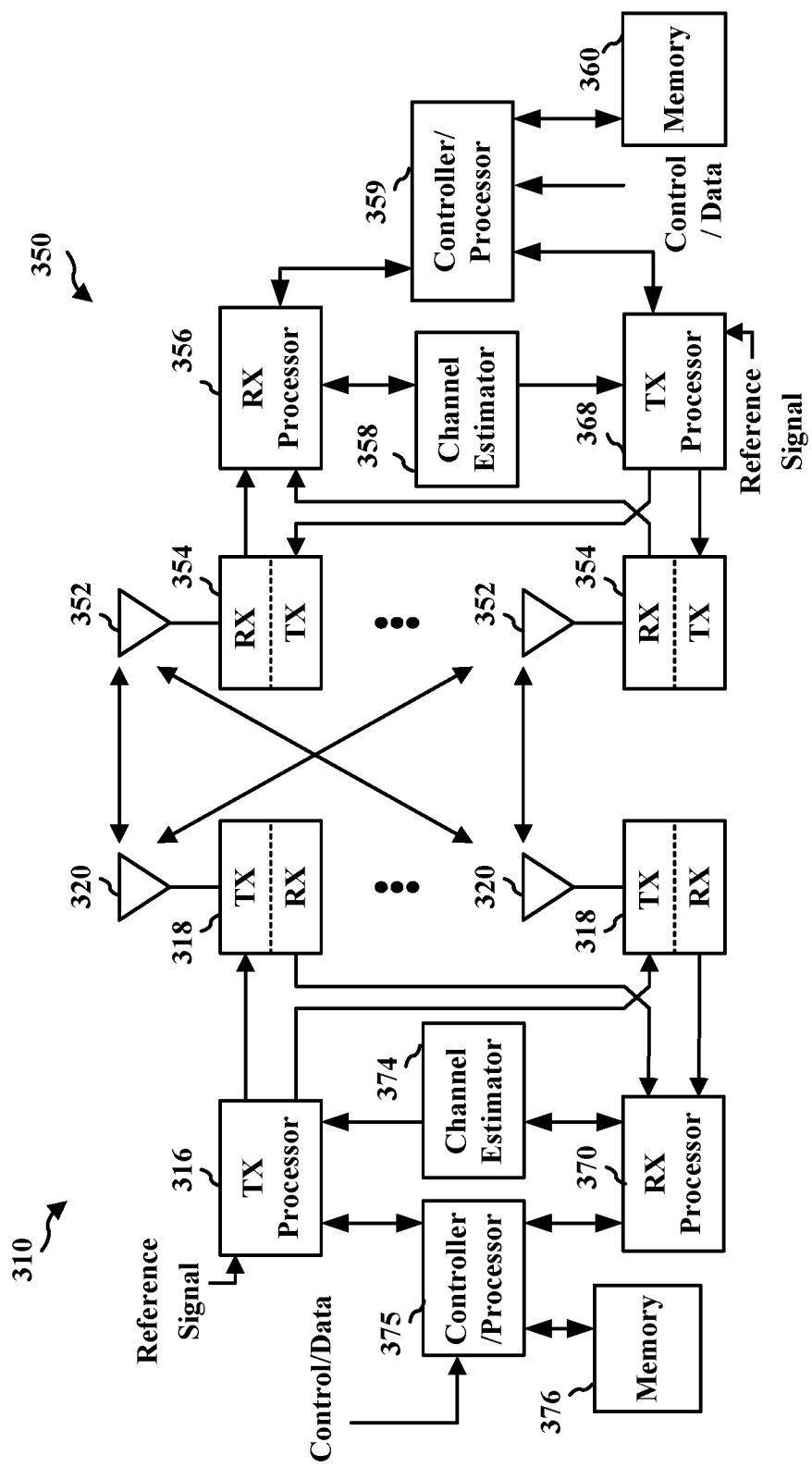
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the gyroscope bias learning component 198 of FIG. 1.

An electronic device (e.g., a UE, an apparatus, a wearable device, etc.) may be able to generate and record the electronic device's dead reckoning (DR) trajectory by using sensors. Under navigation or position tracking, DR may refer to a process of calculating a current position of a moving object (e.g., a user holding/wearing the electronic device that is performing the DR trajectory) based on the speed, heading direction, and/or course of the moving object over a period of time from an initial position (e.g., a previously determined position or fix).

Common sensors used by an electronic device for calculating DR trajectory may include an accelerometer, a gyroscope (which may also be referred to as a "gyro" or a "gyro sensor"), and a magnetometer. The accelerometer (e.g., a three-axis accelerometer) may be used for measuring the moving speed of the electronic device in a linear direction. In some examples, an accelerometer may include abilities to detect gravity as a static acceleration and detect dynamic acceleration applied to the electronic device. The gyroscope (e.g., a three-axis gyroscope) may be used for determining the angular motion of the electronic device. For example, the gyroscope may determine whether the electronic device is twisted in any direction by measuring angular velocity and/or rotational force around three axes (e.g., X-axis, Y-axis, and Z-axis) of the gyroscope. The magnetometer (which may also be referred to as a compass) may be used for sensing magnetic fields, such as detecting a compass moving in a direction relative to the Earth's magnetic north pole. In some examples, the magnetometer may further be used for assisting the calibration of the gyroscope, such as used for determining gyroscope or gyroscopic biases for calibrating the gyroscope. As such, the DR trajectory and/or an absolute orientation of the electronic device may be detected by a combination of the accelerometer, the gyroscope, and the magnetometer, which may also be used for a navigation system of the electronic device.

Figure 4:
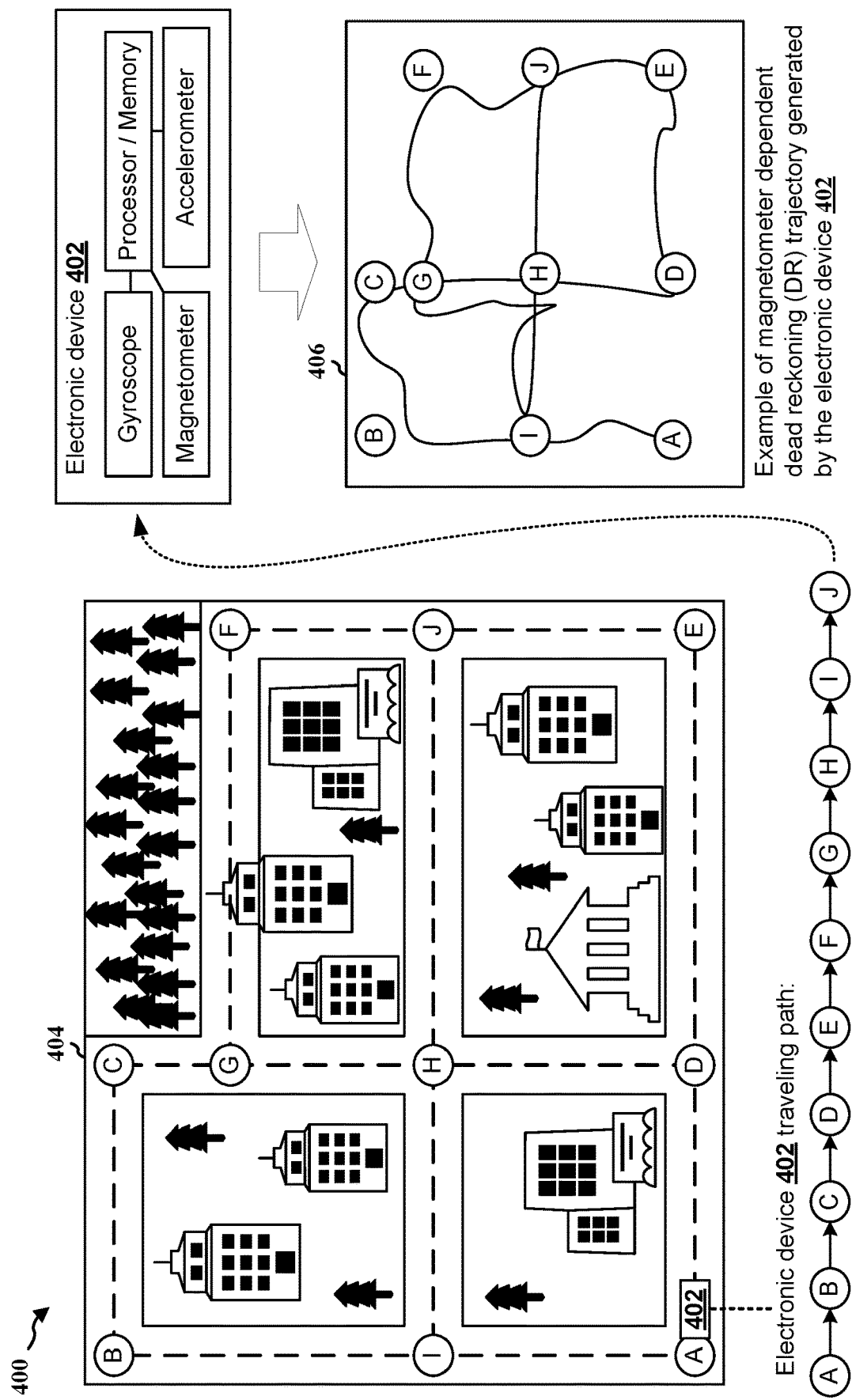
FIG. 4 is a diagram illustrating an example dead reckoning (DR) trajectory that is dependent on a magnetometer in accordance with various aspects of the present disclosure.

FIG. 4 is a diagram 400 illustrating an example DR trajectory that is dependent on a magnetometer in accordance with various aspects of the present disclosure. An electronic device 402 with an accelerometer, a gyroscope, and a magnetometer (which may be coupled to at least one processor and a memory) may have a capability to generate a DR trajectory when the electronic device 402 is moving. In one example, the electronic device 402 may be a smartphone or a wearable device that has a capability to track a user's (e.g., a pedestrian) traveling path, and/or the electronic device 402 may be a GPS/tracking device installed on an automobile that has a capability to track the automobile's traveling path, etc. Then, based on the speed, heading direction, and/or course of the electronic device 402 over a period of time from an initial position, the electronic device 402 may be able to generate a DR trajectory for the electronic device 402.

For example, as shown at 404, the electronic device 402 may be moving alphabetically from Point A to Point J. While the electronic device 402 is moving, the electronic device 402 may use its accelerometer to measure the moving speed of the electronic device 402; use its gyroscope to detect the angular motion of the electronic device 402, such as detecting turns at Points B, C, D, E, etc.; and use its magnetometer to track its heading direction. Then, as shown at 406, based on the data collected from the accelerometer, the gyroscope, and the magnetometer, the electronic device 402 (or the processor of the electronic device 402) may generate a DR trajectory of the electronic device 402 from Point A to Point J.

Accurate positioning may depend heavily on sensors generating a reliable DR trajectory, such as in urban environments. However, an electronic device's ability to generate an accurate DR trajectory may depend on its sensors' qualities and the environmental conditions. For example, the accuracy of the DR trajectory generated by the electronic device 402 may depend on its magnetometer's data quality, which may deteriorate significantly in a magnetized environment and/or on some unconventional devices (e.g., foldable devices, body cams, and/or devices without magnetometer, etc.). Thus, as shown at 406 of FIG. 4, a DR trajectory that relies on a magnetometer may not accurately reflect the traveling path of the electronic device 402 if the electronic device 402 is in a magnetized environment and/or the magnetometer of the electronic device 402 does not have the capability to provide a good data quality. As robust sensor data processing may be crucial for accurate positioning and for addressing growing use cases for the unconventional devices, magnetometer dependent DR trajectory may not be adequate for some positioning applications.

In some scenarios, a magnetometer may also be used to determine gyroscope biases, where the determined gyroscope biases may be used for calibrating the gyroscope. As such, the magnetometer may be an integral component for some DR trajectory generations. However, as discussed in connection with FIG. 4, as a magnetometer may be susceptible to environment anomalies (e.g., city structures that may distort a local magnetic field), it may be beneficial to determine or identify gyroscope biases without a magnetometer.

Aspects presented herein may enable an electronic device to determine gyroscope or gyroscopic biases (hereafter "gyro biases") accurately without a magnetometer. Aspects presented herein may enable a gyroscope to be calibrated in a more power efficient way. As such, aspects presented herein may enable an electronic device, such as a user/pedestrian wearable device, to generate a DR trajectory of the electronic device without a magnetometer and/or without relying on data generated from a magnetometer.

In one aspect, as gyro biases for a gyroscope may be highly dependent on the temperature of the gyroscope, an electronic device with a gyroscope may be configured to create a gyro bias learning module (e.g., a gyro bias temperature model) for estimating/inferring gyro biases for the gyroscope at different temperatures in a power efficient way.

Figure 5:
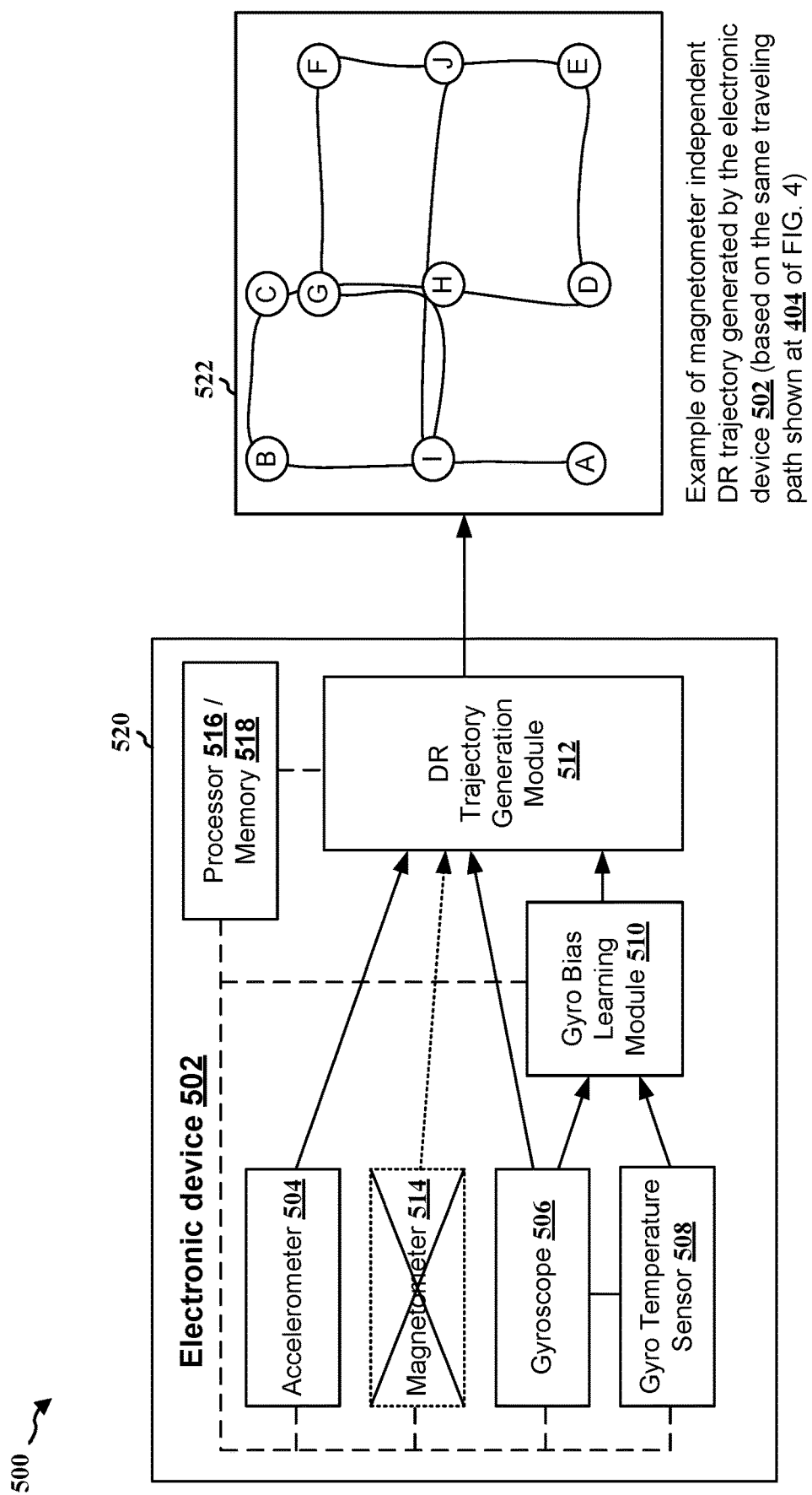
FIG. 5 is a diagram illustrating an example of an electronic device including a gyro bias learning module for estimating gyro biases based at least in part on gyroscope temperatures in accordance with various aspects of the present disclosure.

FIG. 5 is a diagram 500 illustrating an example of an electronic device including a gyro bias learning module for estimating gyro biases based at least in part on gyroscope temperatures in accordance with various aspects of the present disclosure. As shown at 520, an electronic device 502 may include an accelerometer 504 for measuring acceleration/velocity of the electronic device 502, a gyroscope 506 (e.g., a three-axis gyroscope) for determining rotational position and/or angular motion of the electronic device 502, and a gyroscope temperature sensor 508 for measuring and monitoring temperatures of the gyroscope 506. The electronic device 502 may be a UE, an apparatus, a GPS device, an augmented reality (AR) device, a virtual reality (VR) device, a device associated with an automotive application, a device or a component that is part of an automobile, an Internet of Things (IoT) device, a wireless device, and/or a wearable device, etc. Thus, the electronic device 502 may also be a printed circuit (PC) board, a chip, a package, etc. In some examples, a gyroscope-based orientation of the electronic device 502 may be determined without using a magnetometer-based orientation identified by a magnetometer (or without using a magnetometer). For example, a gyroscope-based orientation of the electronic device 502 may be identified based on the accelerometer 504, a camera, and/or a sensor having a capability to determine an angular displacement on the apparatus, etc.

In some examples, the gyroscope temperature sensor 508 may be thermally coupled to the gyroscope 506, located proximal to the gyroscope 506 (e.g., without physically coupling to the gyroscope 506), and/or in the same package or chip as the gyroscope 506. In other examples, the gyroscope temperature sensor 508 may be a sensor that measures and monitors multiple components of the electronic device 502 including the gyroscope 506.

In one aspect, the accelerometer 504, the gyroscope 506, and/or the gyroscope temperature sensor 508 may further be coupled to at least one processor 516 and/or a memory 518, such that the accelerometer 504, the gyroscope 506, and/or the gyroscope temperature sensor 508 may be controlled by the at least one processor 516 and the data generated from the accelerometer 504, the gyroscope 506, and/or the gyroscope temperature sensor 508 may be stored in the memory 518. For example, the at least one processor 516 may be a sensor core or may be associated with a sensor core, where the sensor core may control the gyroscope 506 and may include a gyroscope thermistor. As such, reading/data generated from the gyroscope 506 may be processed by the sensor core, and the sensor core may also calibrate the gyroscope 506 or calibrate reading/data generated from the gyroscope 506. In another example, the at least one processor 516 may include multiple processors that may be configured to process different applications and/or functions of the electronic device 502. Thus, reading/data generated from the gyroscope 506 may be sent to different and/or multiple processors for processing, which may include calibration. As such, in some examples, the accelerometer 504, the gyroscope 506, and/or the gyroscope temperature sensor 508 may be coupled a same processor. In other examples, the accelerometer 504, the gyroscope 506, and/or the gyroscope temperature sensor 508 may be coupled different processors. In other examples, at least one of the accelerometer 504, the gyroscope 506, or the gyroscope temperature sensor 508 may not be coupled to a processor, etc.

Figure 6:
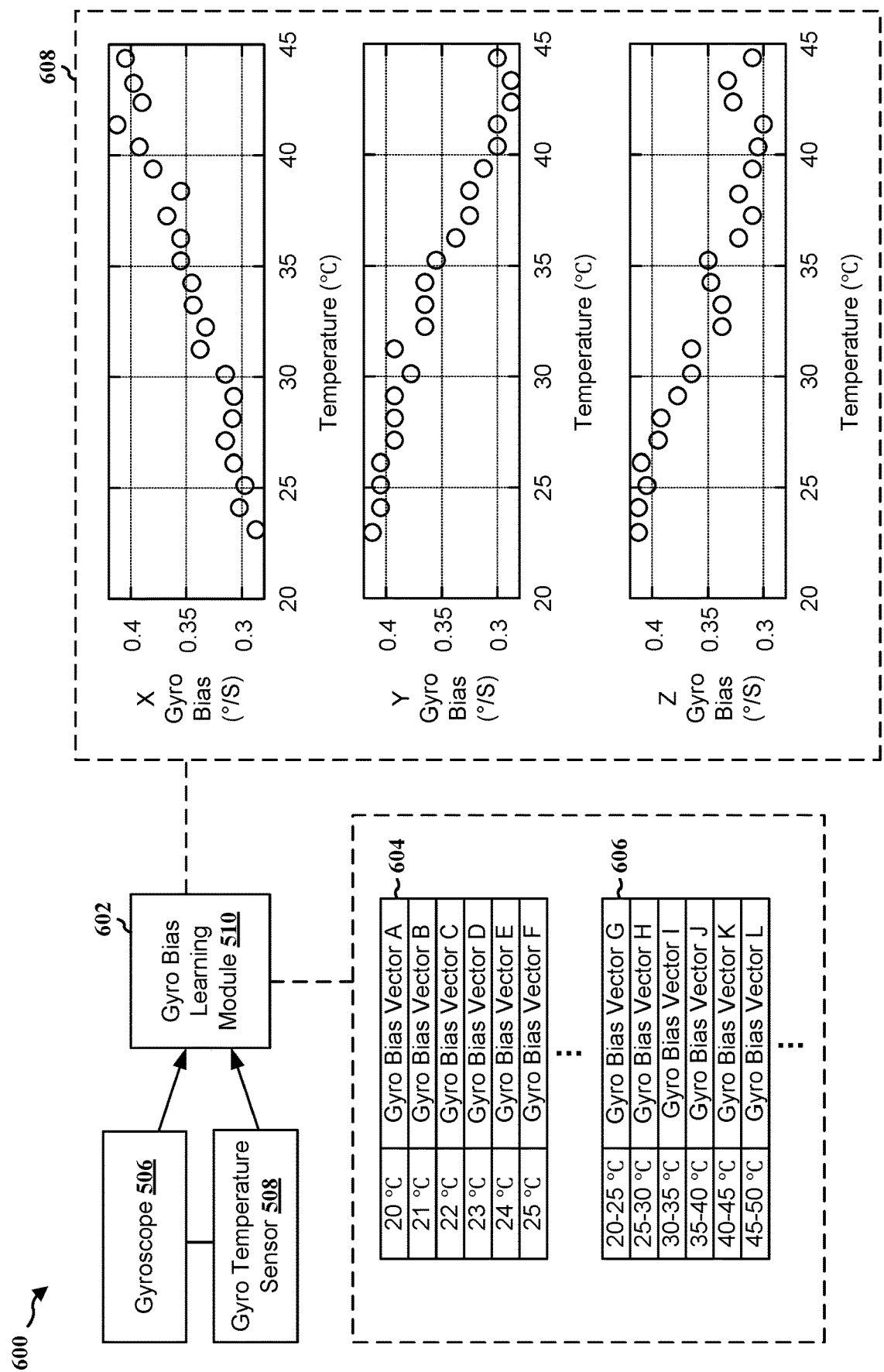
FIG. 6 is a diagram illustrating an example of a gyro bias learning module creating a mapping between different temperatures of the gyroscope and their corresponding gyro biases during a learning process in accordance with various aspects of the present disclosure.

In one aspect of the present disclosure, the electronic device 502 may include a gyro bias learning module 510 that has a capability to estimate a set of gyro biases for a plurality of temperatures or temperature ranges to create a mapping that maps the plurality of temperatures or temperature ranges to the set of gyro biases during a learning process. FIG. 6 is a diagram 600 illustrating an example of a gyro bias learning module creating a mapping between different temperatures of the gyroscope and their corresponding gyro biases during a learning process in accordance with various aspects of the present disclosure. As shown at 602, the gyro bias learning module 510 of the electronic device 502 may be configured to estimate and record gyro biases for the gyroscope 506 at different temperatures during a learning process. In one example, as shown at 602, the gyro bias learning module 510 may be configured to estimate gyro biases at a specific interval (e.g., at each degree, at each half degree, etc.). For example, when the gyroscope 506 is at 20° C., the gyro bias learning module 510 may estimate a gyro bias for the gyroscope 506 at 20° C. and record the estimated gyro bias; when the gyroscope 506 is at 21° C., the gyro bias learning module 510 may estimate a gyro bias for the gyroscope 506 at 21° C. and record the estimated gyro bias; and when the gyroscope 506 is at 22° C., the gyro bias learning module 510 may estimate a gyro bias for the gyroscope 506 at 22° C. and record the estimated gyro bias and so on. To estimate the gyro bias, the gyro bias learning module 510 (or the at least one processor 516) may be configured to stream sensor data for a fixed duration. For example, the gyro bias learning module 510 may stream sensor data via the accelerometer 504 and the gyroscope 506, where the accelerometer 504 may be used to determine if the electronic device 502 is stationary and data generated from the gyroscope 506 may be used to determine the gyroscope calibration if the electronic device 502 is determined to be stationary. Once the gyro biases for different/multiple temperatures are estimated and recorded during the learning process, based on the temperatures of the gyroscope 506, the electronic device 502 may use the recorded gyro biases for calibrating the gyroscope 506 and/or for assisting a DR trajectory generation module 512 (as shown at FIG. 5) for generating a DR trajectory.

For example, the electronic device 502 may monitor the temperature of the gyroscope 506 using the gyro temperature sensor 508. If the gyroscope 506 is at 20° C., the electronic device 502 (or the at least one processor 516) may apply the previously estimated/learned gyro bias at 20° C. (e.g., Gyro Bias Vector A) to the gyroscope 506 and/or to the DR trajectory generation module 512. Then, the electronic device 502 may continue to monitor the temperature of the gyroscope 506 to detect whether there is a temperature change to the gyroscope 506. If the electronic device 502 detects that the temperature of the gyroscope 506 has changed, the electronic device 502 apply the corresponding estimated gyro bias to the gyroscope 506 and/or to the DR trajectory generation module 512 for the newly detected temperature. For example, if the gyroscope 506's temperature has changed to 22° C., the electronic device 502 (or the at least one processor 516) may apply the previously estimated/learned gyro bias at 22° C. (e.g., Gyro Bias Vector C) to the gyroscope 506 and/or to the DR trajectory generation module 512.

In another example, as shown at 606, the gyro bias learning module 510 may estimate gyro biases for the gyroscope 506 at different temperatures, and then the gyro bias learning module 510 may create a mapping between different temperature ranges of the gyroscope 506 and the estimated gyro biases. For example, based on the gyro biases estimated for each degree from 20° C. to 25° C. as shown at 604, the gyro bias learning module 510 may estimate a gyro bias (e.g., an average gyro bias, the Gyro Bias Vector G) that is to be applied to the gyroscope 506 and/or to the DR trajectory generation module 512 when the gyroscope 506 is between 20° C. to 25° C. Similarly, the gyro bias learning module 510 may estimate gyro biases for different temperature ranges, such as from 25° C. to 30° C. and from 30° C. to 35° C., etc. Thus, if the temperature of the gyroscope 506 changes to a different temperature range, the electronic device 502 may apply the corresponding gyro bias for that temperature range.

In another example, as shown at 608, the estimated gyro biases may include gyro biases for X-axis, Y-axis, and Z-axis of the gyroscope 506. As such, at each temperature (e.g., 25° C., 25.5° C., or 26° C., etc.) or at each temperature range (e.g., 25° C. to 30° C., 30° C. to 35° C., etc.), there may be a corresponding gyro bias value for each of the X-axis, Y-axis, and Z-axis of the gyroscope 506.

In some examples, during the learning process, the gyro bias learning module 510 may be configured to measure/estimate the gyro biases when the electronic device 502 is stationary, such as when the electronic device 502 does not include a magnetometer. For example, in some scenarios, a magnetometer based gyroscope may be calibrated when the electronic device is stationary or in motion, whereas a non-magnetometer based gyroscope may be calibrated when the device is stationary but not when the electronic device is in motion.

Similarly, the electronic device 502 may also be configured to calibrate the gyroscope 506 based on the measured gyro biases when the electronic device 502 is stationary. In one example, the electronic device 502 may determine whether it is stationary based on the accelerometer (e.g., whether there is an acceleration) and/or based on whether the electronic device 502 is on a charger (e.g., connecting to a charging cable), etc. In another example, if the electronic device 502 is associated with an automobile (e.g., a GPS/tracking device for the automobile), the electronic device 502 may determine whether it is stationary based on whether the engine of the automobile is running, and/or whether wheel ticks are detected for the automobile, etc. Thus, if the gyro bias does not exist for a temperature or a temperature range and the electronic device 502 is stationary, then the gyro bias learning module 510 may perform the gyro bias estimation by streaming sensor data for a fixed duration. Similarly, if the electronic device 502 is stationary, the electronic device 502 may calibrate the gyroscope 506 if estimated gyro bias is available. In some examples, if the gyroscope 506 and/or the gyro temperature sensor 508 (which may be a thermistor) is coupled to a sensor core (which may be the at least one processor 516 or be associated with the at least one processor 516), the sensor core may be configured to calibrate the gyroscope 506 or data generated from the gyroscope 506. In another example, the at least one processor 516 may include or associated with an application processor (e.g., the application processor 1106) that communicates with the sensor core and performs the calibration. In other words, the application processor may retrieve gyroscope readings and temperatures via the sensor core. In another example, the gyroscope 506 may be calibrated based on a background calibration, such that the gyroscope 506 may be calibrated in the background.

In other examples, after the gyro bias learning module 510 estimates a gyro bias for the gyroscope 506 at a specific temperature or temperature range during the learning process, the gyro bias learning module 510 may skip estimating a gyro bias for that specific temperature or temperature range for a period of time and/or until receiving an instruction to do so. For example, referring back to FIG. 6, if there are gyro biases estimated for the gyroscope 506 at 20° C., 21° C., and 24° C. in a learning process (which may be referred to as "calibrated temperature(s)") but there are no gyro biases estimated for 22° C., 23° C., and 25° C. in that learning process (which may be referred to as "uncalibrated temperature(s)"), the gyro bias learning module 510 may skip estimating gyro biases when the gyroscope 506 is at calibrated temperatures (e.g., at 20° C., 21° C., and 24° C. again). On the other hand, the gyro bias learning module 510 may estimate gyro biases for the gyroscope 506 if the gyroscope 506 is at uncalibrated temperatures (e.g., at 22° C., 23° C., and/or 25° C.) as gyro biases have not yet been estimated for these uncalibrated temperatures. Such configuration may reduce a number of gyro bias estimations performed by the gyro bias learning module 510 during learning processes (e.g., during estimating gyro biases for different temperatures or temperature ranges), which may reduce power consumed by the electronic device 502.

In another example, while the gyro bias learning module 510 is estimating a gyro bias for the gyroscope 506 at a specific temperature or temperature range, the gyro bias learning module 510 may be configured to reject an estimated gyro bias if the estimated gyro bias exceeds a bias noise threshold or a bias threshold. For example, if the gyro bias estimated at 20° C. during a learning process exceeds a bias noise threshold or a maximum gyro bias value permitted, the gyro bias learning module 510 may not record the estimated gyro bias for 20° C. in that learning process. Then, the gyro bias learning module 510 may perform another gyro bias estimation for 20° C. in another learning process. Also, the gyro bias learning module 510 may be configured not to estimate a gyro bias for a particular temperature or temperature range if multiple measurements for that temperature or temperature range indicates a discrepancy.

In another aspect of the present disclosure, if the gyroscope 506 is specified to be calibrated at a specific temperature or temperature range but there is no gyro bias for that temperature or temperature range, the gyro bias learning module 510 may be configured to predict a gyro bias for that temperature or temperature range based at least in part on available gyro biases estimated for other temperatures or temperature ranges. In other words, the gyro bias learning module 510 may be configured to predict gyro biases at unseen gyroscope temperatures.

In one example, as shown by a diagram 700A of FIG. 7A, if there is no gyro bias for a specific temperature or temperature range, the gyro bias learning module 510 may be configured to predict a gyro bias for that specific temperature or temperature range based on a closest adjacent temperature with available gyro bias. For example, the gyro bias learning module 510 may have gyro biases estimated for 20° C., 23° C., 24° C. and 25° C. but not for 21° C. and 22° C. Thus, if the gyroscope 506 is at 21° C. and is specified to be calibrated, the gyro bias learning module 510 may use the gyro bias estimated for 20° C. for the calibration as 20° C. is the closest adjacent temperature to the 21° C. with available gyro bias.

In another example, as shown by a diagram 700B of FIG. 7B, if there is no gyro bias for a specific temperature or temperature range, the gyro bias learning module 510 may be configured to predict a gyro bias for that specific temperature or temperature range based on a linear relationship between two temperatures or temperature ranges with gyro biases available. For example, the gyro bias learning module 510 may estimate a gyro bias of 0.3 for 20° C. and a gyro bias of 0.4 for 22° C. but not for 21° C. Thus, if the gyroscope 506 is at 21° C. and is specified to be calibrated, the gyro bias learning module 510 may use a value that is derived from the slope created between 20° C. and 22° C. (e.g., the slope=0.05/° C.). As such, the gyro bias learning module 510 may estimate the gyro bias for 21° C. to be 0.35.

Figure 7C:
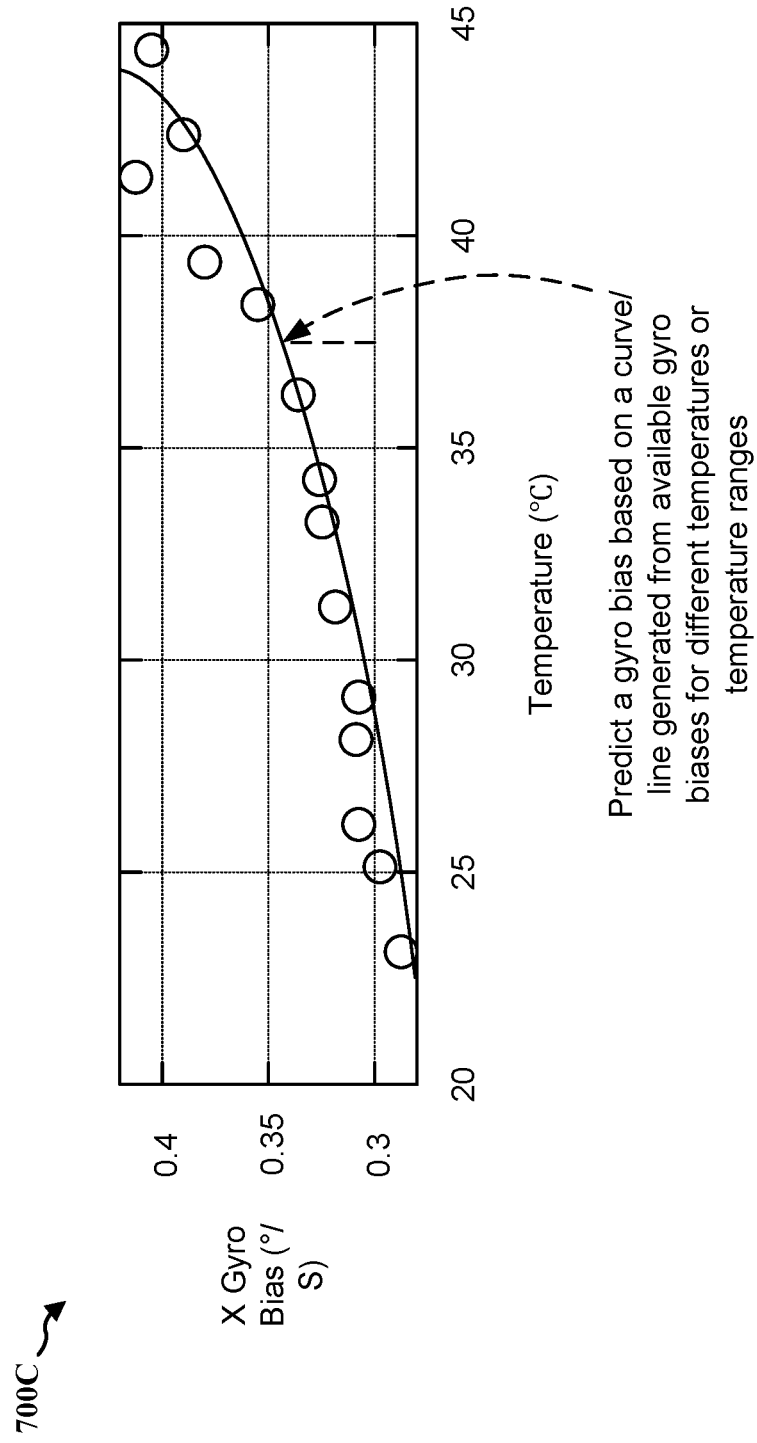
FIG. 7C is a diagram illustrating an example of predicting a gyro bias in accordance with various aspects of the present disclosure.

In another example, as shown by a diagram 700C of FIG. 7C, if there is no gyro bias for a specific temperature or temperature range, the gyro bias learning module 510 may be configured to predict a gyro bias for that specific temperature or temperature range based on a curve or a line that is generated based on available gyro bias values of other temperatures or temperature ranges. In other words, the gyro bias learning module 510 may perform a curve fitting of the available gyroscope biases to estimate gyro biases at unseen/uncalibrated temperatures.

Figure 8:
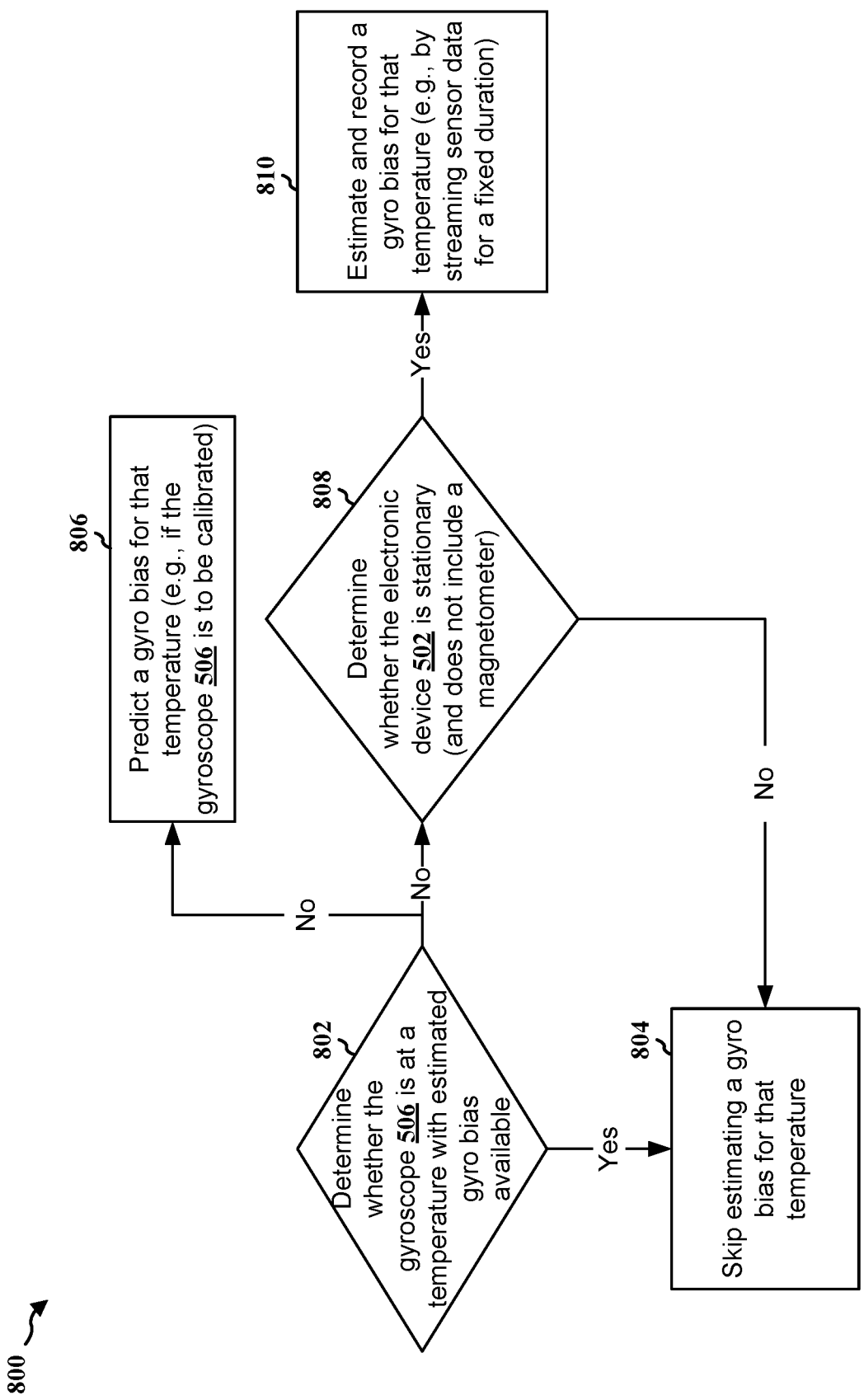
FIG. 8 is a flowchart illustrating an example of the gyro bias learning module determining whether to perform gyro bias estimation for a specific temperature in accordance with various aspects of the present disclosure.

FIG. 8 is a flowchart 800 illustrating an example of the gyro bias learning module determining whether to perform gyro bias estimation for a specific temperature in accordance with various aspects of the present disclosure. At 802, the gyro bias learning module 510 may determine whether the gyroscope 506 is at a temperature with an estimated gyro bias available (e.g., based on the record in the memory 518). In other words, the gyro bias learning module 510 may determine whether the gyroscope 506 is at a calibrated temperature or an uncalibrated temperature. If the gyroscope 506 is at a temperature with an estimated gyro bias available, at 804, the gyro bias learning module 510 may skip estimating a gyro bias for that temperature. However, if the gyroscope 506 is at a temperature without an estimated gyro bias available, in one example, as shown at 806, the gyro bias learning module 510 may be configured to predict a gyro bias value for that temperature, such as if the gyroscope 506 is specified to be calibrated as described in connection with FIGS. 7A, 7B, and 7C. In another example, as shown at 808, the gyro bias learning module 510 may be configured to determine whether the electronic device 502 is stationary (and that the electronic device 502 does not include a magnetometer). If the electronic device 502 is stationary and does not include a magnetometer, at 810, the gyro bias learning module 510 may estimate and record a gyro bias for that temperature (e.g., by streaming sensor data for a fixed duration). However, If the electronic device 502 is not stationary, then as shown at 804, the gyro bias learning module 510 may skip estimating a gyro bias for that temperature.

Referring back to FIG. 5, based at least in part on the gyro biases provided/learned by the gyro bias learning module 510 for different temperatures or temperature ranges, the electronic device 502 may calibrate the gyroscope 506 when the gyroscope 506's temperature changes. In some examples, if the electronic device 502 is generating a DR trajectory via the DR trajectory generation module 512, the gyro bias learning module 510 may also be configured to provide the gyro biases to the DR trajectory generation module 512, such that data generated from gyroscope 506 may be modified/calibrated at the DR trajectory generation module 512 instead. As such, the electronic device 502 may generate the DR trajectory based on just the accelerometer 504 and the gyroscope 506 without a magnetometer, where inaccurate DR trajectory generations caused by environmental anomalies (e.g., strong magnetic fields) or bad quality magnetometers (e.g., magnetometers that do not have the capability to provide good quality measurement) may be reduced or avoided. For example, as shown at 522, the accuracy and precision of a DR trajectory may be improved when a DR trajectory is generated without relying on a magnetometer compared to a DR trajectory generated based on a magnetometer (e.g., as shown at 406 of FIG. 4). After the DR trajectory is generated, the electronic device (or the at least one processor 516) may determine a position (e.g., a relative position or an absolute position) of the electronic device 502 based on the DR trajectory. For example, referring to the map at 404 of FIG. 4, based on the DR trajectory generated as shown at 522, the electronic device 502 may determine its current position is at Point J.

While aspects presented herein may enable a gyroscope to be calibrated and/or a DR trajectory to be generated without a magnetometer, in some scenarios, the electronic device 502 may still include a magnetometer. For example, as shown at 520, the electronic device 502 may include a magnetometer 514, which may be used for various purposes (e.g., for identifying a magnetometer-based orientation of the electronic device, for providing compass functions, for identifying orientation of a user interface, etc.). In one example, to avoid the DR trajectory generation module 512 to generate a DR trajectory that depends on the magnetometer 514 as described in connection with FIG. 4, the DR trajectory generation module 512 (or the at least one processor 516) may be configured not to receive or consider data generated from the magnetometer 514. In other words, the DR trajectory generation module 512 (or the processor 516) may be configured to refrain from receiving an input from the magnetometer 514 for calibrating the gyroscope 506 and/or for generating the DR trajectory for the electronic device 502. Similarly, after the DR trajectory is generated, the electronic device (or the at least one processor 516) may determine a position (e.g., a relative position or an absolute position) of the electronic device 502 based on the DR trajectory.

In another example, if the electronic device 502 includes the magnetometer 514, the electronic device 502 (or the at least one processor 516) may be configured to use the magnetometer 514 for calibrating the gyroscope 506 and/or for generating the DR trajectory if the gyroscope 506 is at an uncalibrated temperature or temperature range (e.g., there is no available gyro bias estimated for that temperature or temperature range). However, if the gyroscope 506 is at a calibrated temperature or temperature range (e.g., there is a gyro bias estimated for that temperature or temperature range), then the electronic device 502 (or the at least one processor 516) may ignore data generated from the magnetometer. Similarly, after the DR trajectory is generated, the electronic device (or the at least one processor 516) may determine a position (e.g., a relative position or an absolute position) of the electronic device 502 based on the DR trajectory.

In another example, if the electronic device 502 includes the magnetometer 514, the electronic device 502 (or the at least one processor 516) may use the magnetometer 514 in association with calibrating the gyroscope 506 and/or for generating the DR trajectory if the magnetic/metallic field detected by the electronic device 502 is below a disturbance threshold. In other words, the electronic device 502 may use the magnetometer 514 for calibrating the gyroscope 506 and/or for generating the DR trajectory when there is no magnetic/metallic field disturbance present. However, if the electronic device 502 detects a magnetic/metallic field disturbance (e.g., the magnetic/metallic field is above the disturbance threshold), the electronic device 502 (or the at least one processor 516) may be configured to refrain from calibrating the gyroscope 506 and/or generating the DR trajectory based on the magnetometer 514.

In another aspect of the present disclosure, the electronic device 502 (or the at least one processor 516) may be configured to calibrate the gyroscope 506 if the temperature change of the gyroscope 506 exceeds a temperature threshold, and the electronic device 502 (or the at least one processor 516) may not calibrate the gyroscope 506 if the temperature change does not exceed the temperature threshold. For example, the electronic device 502 (or the at least one processor 516) may be configured to calibrate the gyroscope 506 if the detected temperature change (e.g., via the gyro temperature sensor 508) exceeds two (2) degrees Celsius. Thus, if the electronic device 502 (or the at least one processor 516) detects that the temperature of the gyroscope 506 changes from 20° C. to 23° C., the electronic device 502 may calibrate the gyroscope 506. On the other hand, if the electronic device 502 (or the at least one processor 516) detects that the temperature of the gyroscope 506 changes from 20° C. to 21° C., the electronic device 502 may not calibrate the gyroscope 506. Such configuration may reduce a number of times the gyroscope 506 being calibrated, which may provide a more power efficient way for using a gyroscope.

In some scenarios, the electronic device 502 may include compensation factors stored for calibrating the gyroscope 506 (e.g., based on a set of default values). Thus, in some examples, the electronic device 502 (or the at least one processor 516) may also be configured to calibrate the gyroscope 506 using the gyro bias estimated by the gyro bias learning module 510 for a temperature or temperature range if the estimated gyro bias is different from the stored compensation factor (e.g., a default compensation factor) for that temperature or temperature range by a compensation threshold. Then, the gyro bias learning module 510 may update the stored compensation factor for that temperature or temperature range with the gyro bias estimated by the gyro bias learning module 510.

Figure 9:
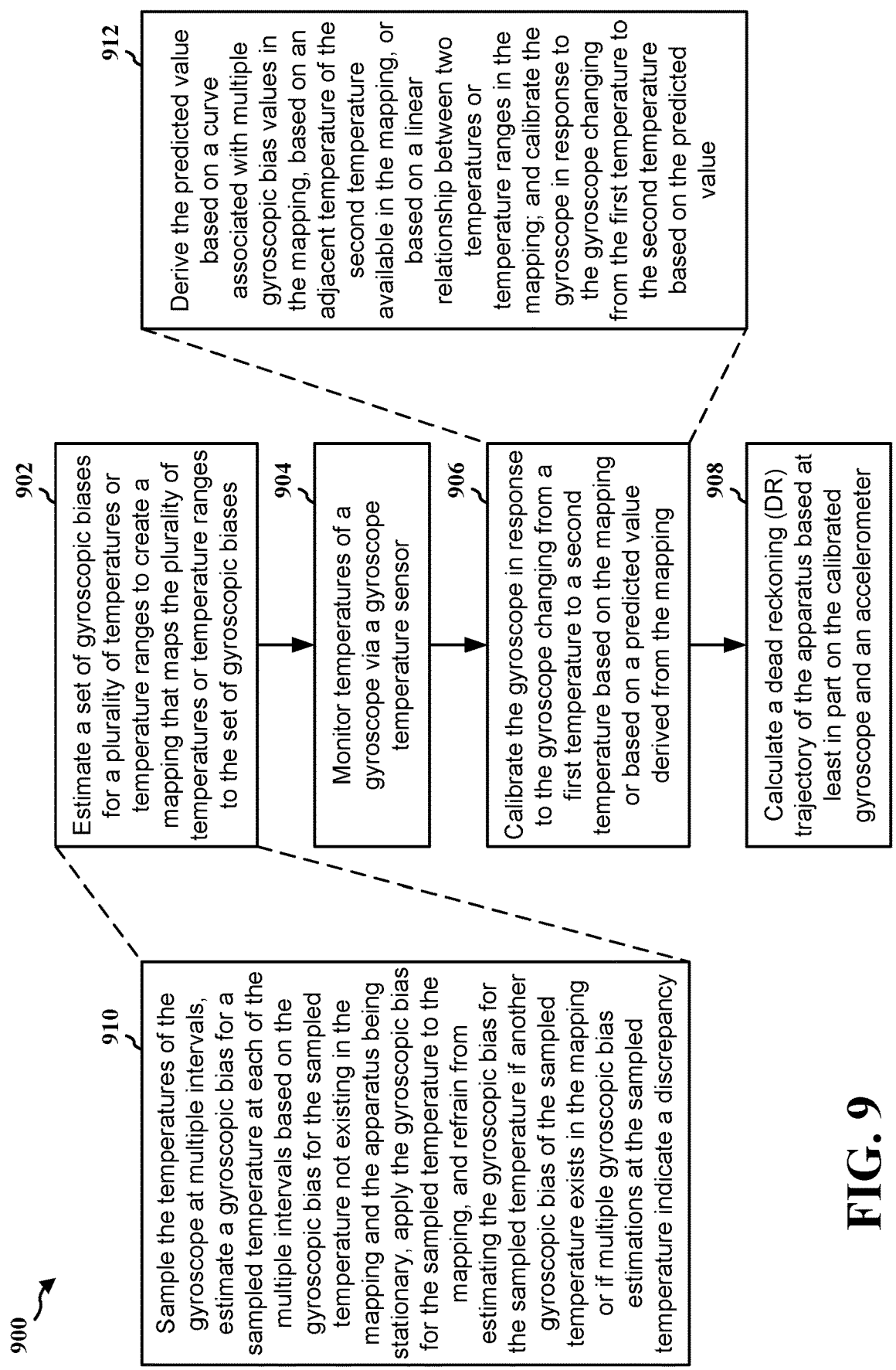
FIG. 9 is a flowchart of a method of wireless communication in accordance with aspects presented herein.

FIG. 9 is a flowchart 900 of a method of gyroscope calibration. The method may be performed by an apparatus or a component of an apparatus (e.g., the UE 104, 350; the electronic device 402, 502; the apparatus 1102; a processing system, which may include the memory 360 and which may be the entire UE 350 or a component of the UE 350, such as the TX processor 368, the RX processor 356, and/or the controller/processor 359). The method may enable the apparatus to determine gyroscope biases and calibrate a gyroscope without a magnetometer or without relying data generated from a magnetometer.

At 902, the apparatus may estimate a set of gyroscopic biases for a plurality of temperatures or temperature ranges to create a mapping that maps the plurality of temperatures or temperature ranges to the set of gyroscopic biases, such as described in connection with FIGS. 5, 6, and 8. For example, the electronic device 502 may estimate gyro biases at different gyroscope temperatures, and then the electronic device 502 may map an estimated gyro bias to each of multiple temperatures or temperature ranges. The estimation of the gyro biases and/or the creation of the mapping may be performed by, e.g., the gyro bias learning component 1140, the gyroscope 1115, and/or the gyro temperature sensor 1119 of the apparatus 1102 in FIG. 11. In one example, the set of gyroscopic biases may be estimated when the apparatus is stationary if the apparatus does not include magnetometer. In another example, the mapping may map each of the plurality of temperatures or temperature ranges to a gyroscopic bias value in the set of gyroscopic biases. The apparatus may include one or more of: a pedestrian UE, an augmented reality (AR) device, a virtual reality (VR) device, a device associated with an automotive application, a wireless device, or an IoT device. In some aspects, the apparatus may include at least one of a transceiver or an antenna coupled to the at least one processor.

In one example, as shown at 910, to estimate the set of gyroscopic biases for the plurality of temperatures or temperature ranges to create the mapping, the apparatus may sample the temperatures of the gyroscope at multiple intervals, estimate a gyroscopic bias for a sampled temperature at each of the multiple intervals based on the gyroscopic bias for the sampled temperature not existing in the mapping and the apparatus being stationary, apply the gyroscopic bias for the sampled temperature to the mapping, and refrain from estimating the gyroscopic bias for the sampled temperature if another gyroscopic bias of the sampled temperature exists in the mapping or if multiple gyroscopic bias estimations at the sampled temperature indicate a discrepancy, such as described in connection with FIGS. 7A, 7B, and 7C. In such an example, to estimate the gyroscopic bias for the sampled temperature, the apparatus may stream sensor data for a fixed duration.

In another example, to estimate the set of gyroscopic biases for the plurality of temperatures or temperature ranges to create the mapping that maps the plurality of temperatures or temperature ranges to the set of gyroscopic biases, the apparatus may estimate a gyroscopic bias for each of the plurality of temperatures or temperature ranges, record the estimated gyroscopic bias to the mapping based on the estimated gyroscopic bias not exceeding a bias noise threshold, and exclude the estimated gyroscopic bias from the mapping based on the estimated gyroscopic bias exceeding the bias noise threshold.

At 904, the apparatus may monitor temperatures of a gyroscope via a gyroscope temperature sensor, such as described in connection with FIGS. 5 and 6. For example, the electronic device 502 may monitor the temperatures of the gyroscope 506 via the gyro temperature sensor 508. The monitor of the temperatures of a gyroscope may be performed by, e.g., the gyro temperature monitor component 1142 and/or the gyro temperature sensor 1119 of the apparatus 1102 in FIG. 11.

At 906, the apparatus may calibrate the gyroscope in response to the gyroscope changing from a first temperature to a second temperature based on the mapping or based on a predicted value derived from the mapping, such as described in connection with FIG. 5. For example, electronic device 502 may calibrate the gyroscope 506 if the electronic device 502 detects that there is a change in temperature of the gyroscope 506 based on the gyro biases learned or based on a predicted value derived from learned gyro biases. The calibration of the gyroscope may be performed by, e.g., the gyro calibration component 1144 and/or the gyroscope 1115 of the apparatus 1102 in FIG. 11.

In one example, as shown at 912, if the mapping does not include a gyroscopic bias value corresponding to the second temperature, the apparatus may derive the predicted value based on a curve fit predicated based on multiple gyroscopic bias values in the mapping, based on an adjacent temperature of the second temperature available in the mapping, or based on a linear relationship between two temperatures or temperature ranges in the mapping. Then, the apparatus may calibrate the gyroscope in response to the gyroscope changing from the first temperature to the second temperature based on the predicted value.

In another example, the gyroscope may be calibrated when the apparatus is stationary and the gyroscope may not be calibrated when the apparatus is not stationary.

In another example, to calibrate the gyroscope, the apparatus may refrain from receiving an input from a magnetometer to calibrate the gyroscope.

In another example, the apparatus may include a magnetometer coupled to the gyroscope. In such an example, the apparatus may calibrate the gyroscope based at least in part on the magnetometer if the gyroscope is not calibrated based on the mapping at the second temperature, and the apparatus may refrain from calibrating the gyroscope based at least in part on the magnetometer if the gyroscope is calibrated based on the mapping at the second temperature.

In another example, if the apparatus may include a magnetometer coupled to the gyroscope, the apparatus may calibrate the gyroscope based at least in part on the magnetometer in response to a measured magnetic field disturbance that is less than a disturbance threshold, and the apparatus may refrain from calibrating the gyroscope based on the magnetometer if the measured magnetic field disturbance is greater than the disturbance threshold.

In another example, the apparatus may calibrate the gyroscope further based on the gyroscope being at an uncalibrated temperature or a difference between the first temperature and the second temperature being greater than a temperature threshold.

In another example, the apparatus may calibrate the gyroscope further based on a gyroscopic bias value for the second temperature in the mapping being different from a stored compensation factor for the second temperature by a compensation threshold, and the apparatus may update the stored compensation factor for the second temperature based on the gyroscopic bias value for the second temperature in the mapping.

At 908, the apparatus may calculate a DR trajectory of the apparatus based at least in part on the calibrated gyroscope and an accelerometer, such as described in connection with FIG. 5. For example, the electronic device 502 may calculate a DR trajectory of the electronic device 502 using the accelerometer 504 and the gyroscope 506. The calculation of the DR trajectory may be performed by, e.g., the DR trajectory generation component 1146, the gyroscope 1115, and/or the accelerometer 1113 of the apparatus 1102 in FIG. 11. In one example, the DR trajectory may be calculated without using a magnetometer or without using data generated from the magnetometer.

Figure 10:
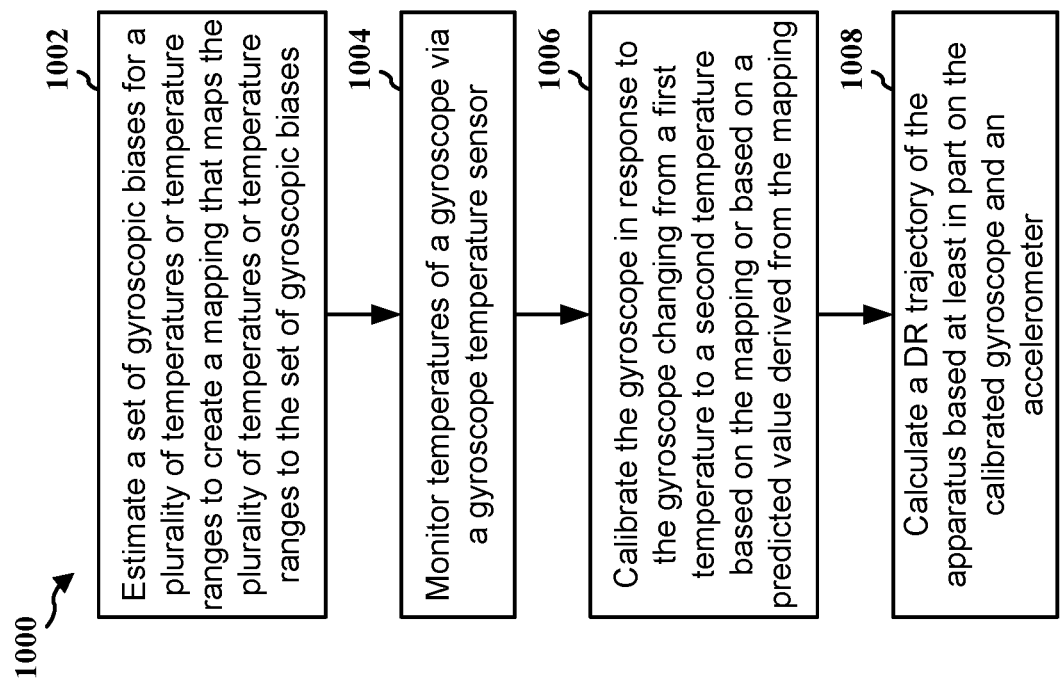
FIG. 10 is a flowchart of a method of wireless communication in accordance with aspects presented herein.

FIG. 10 is a flowchart 1000 of a method of gyroscope calibration. The method may be performed by an apparatus or a component of an apparatus (e.g., the UE 104, 350; the electronic device 402, 502; the apparatus 1102; a processing system, which may include the memory 360 and which may be the entire UE 350 or a component of the UE 350, such as the TX processor 368, the RX processor 356, and/or the controller/processor 359). The method may enable the apparatus to determine gyroscope biases and calibrate a gyroscope without a magnetometer or without relying data generated from a magnetometer.

At 1002, the apparatus may estimate a set of gyroscopic biases for a plurality of temperatures or temperature ranges to create a mapping that maps the plurality of temperatures or temperature ranges to the set of gyroscopic biases, such as described in connection with FIGS. 5, 6 and 8. For example, the electronic device 502 may estimate gyro biases at different gyroscope temperatures, and then the electronic device 502 may map an estimated gyro bias to each of multiple temperatures or temperature ranges. The estimation of the gyro biases and/or the creation of the mapping may be performed by, e.g., the gyro bias learning component 1140, the gyroscope 1115, and/or the gyro temperature sensor 1119 of the apparatus 1102 in FIG. 11. In one example, the set of gyroscopic biases may be estimated when the apparatus is stationary if the apparatus 1102 does not include a magnetometer. In another example, the mapping may map each of the plurality of temperatures or temperature ranges to a gyroscopic bias value in the set of gyroscopic biases. The apparatus may include one or more of: a pedestrian UE, a device associated with an automotive application, an AR device, a VR device, a wireless device, or an IoT device. In some aspects, the apparatus may include at least one of a transceiver or an antenna coupled to the at least one processor.

In one example, to estimate the set of gyroscopic biases for the plurality of temperatures or temperature ranges to create the mapping, the apparatus may sample the temperatures of the gyroscope at multiple intervals, estimate a gyroscopic bias for a sampled temperature at each of the multiple intervals based on the gyroscopic bias for the sampled temperature not existing in the mapping and the apparatus being stationary, apply the gyroscopic bias for the sampled temperature to the mapping, and refrain from estimating the gyroscopic bias for the sampled temperature if another gyroscopic bias of the sampled temperature exists in the mapping or if multiple gyroscopic bias estimations at the sampled temperature indicate a discrepancy, such as described in connection with FIGS. 7A, 7B, and 7C. In such an example, to estimate the gyroscopic bias for the sampled temperature, the apparatus may stream sensor data for a fixed duration.

In another example, to estimate the set of gyroscopic biases for the plurality of temperatures or temperature ranges to create the mapping that maps the plurality of temperatures or temperature ranges to the set of gyroscopic biases, the apparatus may estimate a gyroscopic bias for each of the plurality of temperatures or temperature ranges, record the estimated gyroscopic bias to the mapping based on the estimated gyroscopic bias not exceeding a bias noise threshold, and exclude the estimated gyroscopic bias from the mapping based on the estimated gyroscopic bias exceeding the bias noise threshold.

At 1004, the apparatus may monitor temperatures of a gyroscope via a gyroscope temperature sensor, such as described in connection with FIGS. 5 and 6. For example, the electronic device 502 may monitor the temperatures of the gyroscope 506 via the gyro temperature sensor 508. The monitor of the temperatures of a gyroscope may be performed by, e.g., the gyro temperature monitor component 1142 and/or the gyro temperature sensor 1119 of the apparatus 1102 in FIG. 11.

At 1006, the apparatus may calibrate the gyroscope in response to the gyroscope changing from a first temperature to a second temperature based on the mapping or based on a predicted value derived from the mapping, such as described in connection with FIG. 5. For example, electronic device 502 may calibrate the gyroscope 506 if the electronic device 502 detects that there is a change in temperature of the gyroscope 506 based on the gyro biases learned or based on a predicted value derived from learned gyro biases. The calibration of the gyroscope may be performed by, e.g., the gyro calibration component 1144 and/or the gyroscope 1115 of the apparatus 1102 in FIG. 11.

In one example, if the mapping does not include a gyroscopic bias value corresponding to the second temperature, the apparatus may derive the predicted value based on a curve fit predicated based on multiple gyroscopic bias values in the mapping, based on an adjacent temperature of the second temperature available in the mapping, or based on a linear relationship between two temperatures or temperature ranges in the mapping. Then, the apparatus may calibrate the gyroscope in response to the gyroscope changing from the first temperature to the second temperature based on the predicted value.

In another example, the gyroscope may be calibrated when the apparatus is stationary and the gyroscope may not be calibrated when the apparatus is not stationary.

In another example, to calibrate the gyroscope, the apparatus may refrain from receiving an input from a magnetometer to calibrate the gyroscope.

In another example, the apparatus may include a magnetometer coupled to the gyroscope. In such an example, the apparatus may calibrate the gyroscope based at least in part on the magnetometer if the gyroscope is not calibrated based on the mapping at the second temperature, and the apparatus may refrain from calibrating the gyroscope based at least in part on the magnetometer if the gyroscope is calibrated based on the mapping at the second temperature.

In another example, if the apparatus may include a magnetometer coupled to the gyroscope, the apparatus may calibrate the gyroscope based at least in part on the magnetometer in response to a measured magnetic field disturbance that is less than a disturbance threshold, and the apparatus may refrain from calibrating the gyroscope based on the magnetometer if the measured magnetic field disturbance is greater than the disturbance threshold.

In another example, the apparatus may calibrate the gyroscope further based on the gyroscope being at an uncalibrated temperature or a difference between the first temperature and the second temperature being greater than a temperature threshold.

In another example, the apparatus may calibrate the gyroscope further based on a gyroscopic bias value for the second temperature in the mapping being different from a stored compensation factor for the second temperature by a compensation threshold, and the apparatus may update the stored compensation factor for the second temperature based on the gyroscopic bias value for the second temperature in the mapping.

At 1008, the apparatus may calculate a DR trajectory of the apparatus based at least in part on the calibrated gyroscope and an accelerometer, such as described in connection with FIG. 5. For example, the electronic device 502 may calculate a DR trajectory of the electronic device 502 using the accelerometer 504 and the gyroscope 506. The calculation of the DR trajectory may be performed by, e.g., the DR trajectory generation component 1146, the gyroscope 1115, and/or the accelerometer 1113 of the apparatus 1102 in FIG. 11. In one example, the DR trajectory may be calculated without using a magnetometer or without using data generated from the magnetometer.

Figure 11:
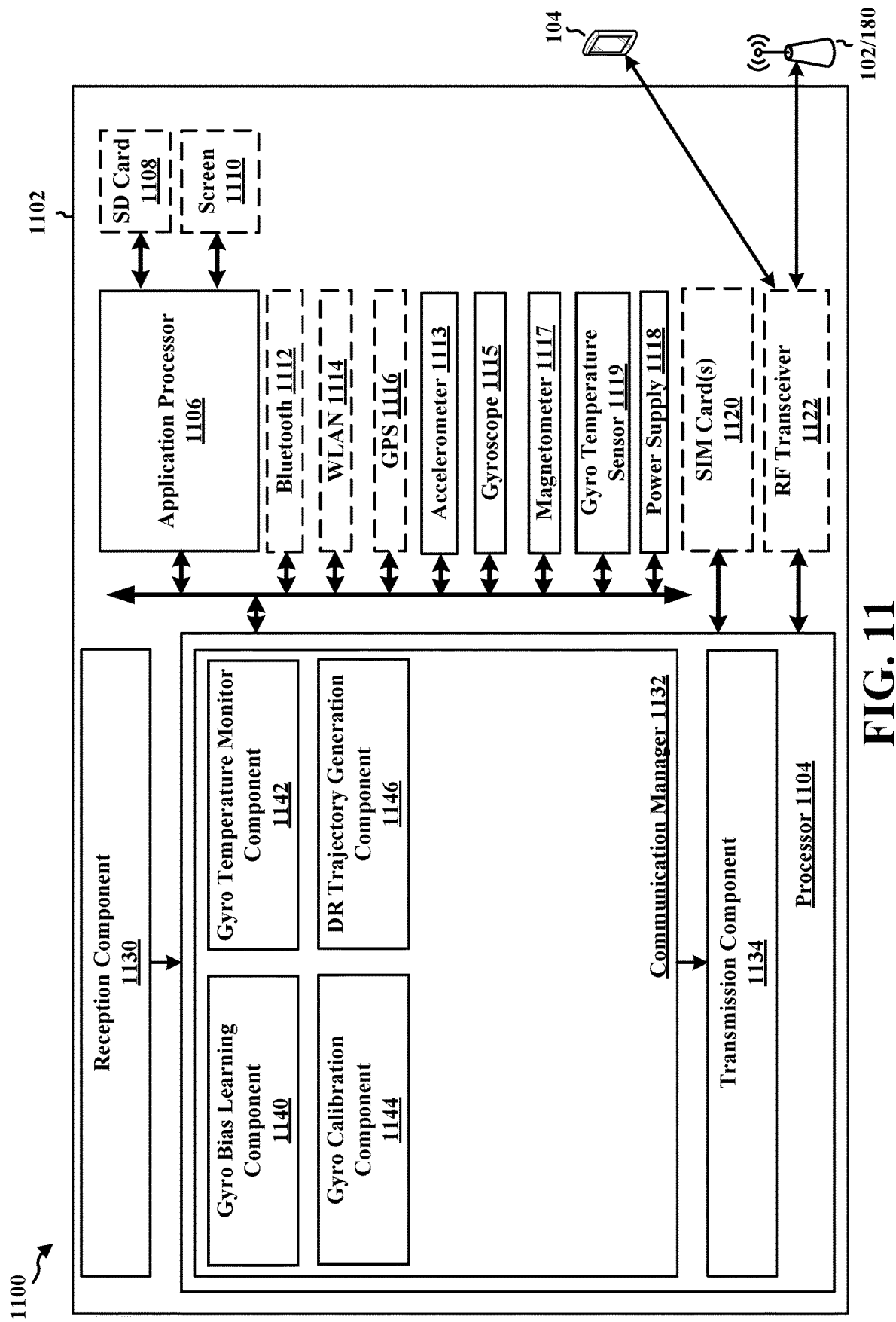
FIG. 11 is a diagram illustrating an example of a hardware implementation for an example apparatus in accordance with aspects presented herein.

FIG. 11 is a diagram 1100 illustrating an example of a hardware implementation for an apparatus 1102. In some examples, the apparatus 1102 may be a UE, a component of a UE, or may implement UE functionality. In other examples, the apparatus 1102 may be an electronic device (e.g., a pedestrian wearable device) capable of generating DR trajectories, a component of electronic device capable of generating DR trajectories, or may implement DR trajectory generation functionality. In some aspects, the apparatus 1102 may include a processor 1104 (which may be referred to as a modem in some examples) coupled to an RF transceiver 1122. In some aspects, the apparatus 1102 may further include one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, accelerometer 1113, a gyroscope 1115, a gyro temperature sensor 1119 thermally coupled to the gyroscope 1115, a magnetometer 1117, or a power supply 1118. The processor 1104 communicates through the RF transceiver 1122 with the UE 104 and/or BS 102/180. The processor 1104 may include a computer-readable medium/memory. The computer-readable medium/memory may be non-transitory. The processor 1104 is responsible for general processing, including the execution of software stored on the computer-readable medium/memory. The software, when executed by the processor 1104, causes the processor 1104 to perform the various functions described supra. The computer-readable medium/memory may also be used for storing data that is manipulated by the processor 1104 when executing software. The processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the processor 1104. The processor 1104 may be a component of the UE 350 and may include the memory 360 and/or at least one of the TX processor 368, the RX processor 356, and the controller/processor 359. In one configuration, the apparatus 1102 may be a modem chip and include just the processor 1104, and in another configuration, the apparatus 1102 may be the entire UE (e.g., see 350 of FIG. 3) and include the additional modules of the apparatus 1102. In another configuration, the apparatus 1102 may be pedestrian wearable device and include just the processor 1104, the accelerometer 1113, the gyroscope 1115 and the gyro temperature sensor 1119.

The communication manager 1132 includes a gyro bias learning component 1140 that is configured to estimate a set of gyroscopic biases for a plurality of temperatures or temperature ranges to create a mapping that maps the plurality of temperatures or temperature ranges to the set of gyroscopic biases, e.g., as described in connection with 902 of FIG. 9 and/or 1002 of FIG. 10. The communication manager 1132 further includes a gyro temperature monitor component 1142 that is configured to monitor the temperatures of the gyroscope via the gyroscope temperature sensor, e.g., as described in connection with 904 of FIG. 9 and/or 1004 of FIG. 10. The communication manager 1132 further includes a gyro calibration component 1144 that is configured to calibrate the gyroscope in response to the gyroscope changing from a first temperature to a second temperature based on the mapping or based on a predicted value derived from the mapping, e.g., as described in connection with 906 of FIG. 9 and/or 1006 of FIG. 10. The communication manager 1132 further includes a DR trajectory generation component 1146 that is configured to calculate a dead reckoning (DR) trajectory of the apparatus based at least in part on the calibrated gyroscope and the accelerometer, e.g., as described in connection with 910 of FIG. 9 and/or 1010 of FIG. 10.

The apparatus may include additional components that perform each of the blocks of the algorithm in the flowcharts of FIGS. 9 and 10. As such, each block in the flowcharts of FIGS. 9 and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1102 may include a variety of components configured for various functions. In one configuration, the apparatus 1102, and in particular the processor 1104, includes means for estimating a set of gyroscopic biases for a plurality of temperatures or temperature ranges to create a mapping that maps the plurality of temperatures or temperature ranges to the set of gyroscopic biases (e.g., the gyro bias learning component 1140, the gyroscope 1115, and/or the gyro temperature sensor 1119). The apparatus 1102 includes means for monitoring the temperatures of the gyroscope via the gyroscope temperature sensor (e.g., the gyro temperature monitor component 1142 and/or the gyro temperature sensor 1119). The apparatus 1102 includes means for calibrating the gyroscope in response to the gyroscope changing from a first temperature to a second temperature based on the mapping or based on a predicted value derived from the mapping (e.g., the gyro calibration component 1144 and/or the gyroscope 1115). The apparatus 1102 includes means for calculating a DR trajectory of the apparatus based at least in part on the calibrated gyroscope and the accelerometer (e.g., the DR trajectory generation component 1146, the gyroscope 1115, and/or the accelerometer 1113).

In one configuration, the mapping may map each of the plurality of temperatures or temperature ranges to a gyroscopic bias value in the set of gyroscopic biases. In another configuration, the apparatus may include one or more of: a pedestrian UE, an AR device, a VR device, a device associated with an automotive application, a wireless device, or an IoT device. In another configuration, the apparatus may include at least one of a transceiver or an antenna coupled to the at least one processor.

In one configuration, to estimate the set of gyroscopic biases for the plurality of temperatures or temperature ranges to create the mapping, the apparatus 1102 includes means for sampling the temperatures of the gyroscope at multiple intervals, means for estimating a gyroscopic bias for a sampled temperature at each of the multiple intervals based on the gyroscopic bias for the sampled temperature not existing in the mapping and the apparatus being stationary, means for applying the gyroscopic bias for the sampled temperature to the mapping, and means for refraining from estimating the gyroscopic bias for the sampled temperature if another gyroscopic bias of the sampled temperature exists in the mapping or if multiple gyroscopic bias estimations at the sampled temperature indicate a discrepancy (e.g., the gyro bias learning component 1140, the gyroscope 1115, and/or the gyro temperature sensor 1119). In such a configuration, to estimate the gyroscopic bias for the sampled temperature, the apparatus 1102 includes means for streaming sensor data for a fixed duration.

In another configuration, to estimate the set of gyroscopic biases for the plurality of temperatures or temperature ranges to create the mapping that maps the plurality of temperatures or temperature ranges to the set of gyroscopic biases, the apparatus 1102 includes means for estimating a gyroscopic bias for each of the plurality of temperatures or temperature ranges, means for recording the estimated gyroscopic bias to the mapping based on the estimated gyroscopic bias not exceeding a bias noise threshold, and means for excluding the estimated gyroscopic bias from the mapping based on the estimated gyroscopic bias exceeding the bias noise threshold (e.g., the gyro bias learning component 1140, the gyroscope 1115, and/or the gyro temperature sensor 1119).

In another configuration, if the mapping does not include a gyroscopic bias value corresponding to the second temperature, the apparatus 1102 includes means for deriving the predicted value based on a curve associated with multiple gyroscopic bias values in the mapping, based on an adjacent temperature of the second temperature available in the mapping, or based on a linear relationship between two temperatures or temperature ranges in the mapping (e.g., the gyro calibration component 1144 and/or the gyroscope 1115). The apparatus 1102 may also include means for calibrating the gyroscope in response to the gyroscope changing from the first temperature to the second temperature based on the predicted value.

In another configuration, the gyroscope may be calibrated when the apparatus is stationary and the gyroscope may not be calibrated when the apparatus is not stationary.

In another configuration, to calibrate the gyroscope, the apparatus 1102 includes means for refraining from receiving an input from a magnetometer to calibrate the gyroscope.

In another configuration, the apparatus 1102 may include a magnetometer coupled to the gyroscope. In such a configuration, the apparatus includes means for calibrating the gyroscope based at least in part on the magnetometer if the gyroscope is not calibrated based on the mapping at the second temperature, and means for refraining from calibrating the gyroscope based at least in part on the magnetometer if the gyroscope is calibrated based on the mapping at the second temperature (e.g., the gyro calibration component 1144, the magnetometer 1117, and/or the gyroscope 1115).

In another configuration, if the apparatus 1102 may include a magnetometer coupled to the gyroscope, the apparatus includes means for calibrating the gyroscope based at least in part on the magnetometer in response to a measured magnetic field disturbance that is less than a disturbance threshold, and means for refraining from calibrating the gyroscope based on the magnetometer if the measured magnetic field disturbance is greater than the disturbance threshold (e.g., the gyro calibration component 1144, the magnetometer 1117, and/or the gyroscope 1115).

In another configuration, the apparatus 1102 include means for calibrating the gyroscope further based on the gyroscope being at an uncalibrated temperature or a difference between the first temperature and the second temperature being greater than a temperature threshold.

In another configuration, the apparatus 1102 include means for calibrating the gyroscope further based on a gyroscopic bias value for the second temperature in the mapping being different from a stored compensation factor for the second temperature by a compensation threshold, and the apparatus may update the stored compensation factor for the second temperature based on the gyroscopic bias value for the second temperature in the mapping.

In another configuration, the DR trajectory may be calculated without using a magnetometer or without using data generated from the magnetometer.

The means may be one or more of the components of the apparatus 1102 configured to perform the functions recited by the means. As described supra, the apparatus 1102 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 12:
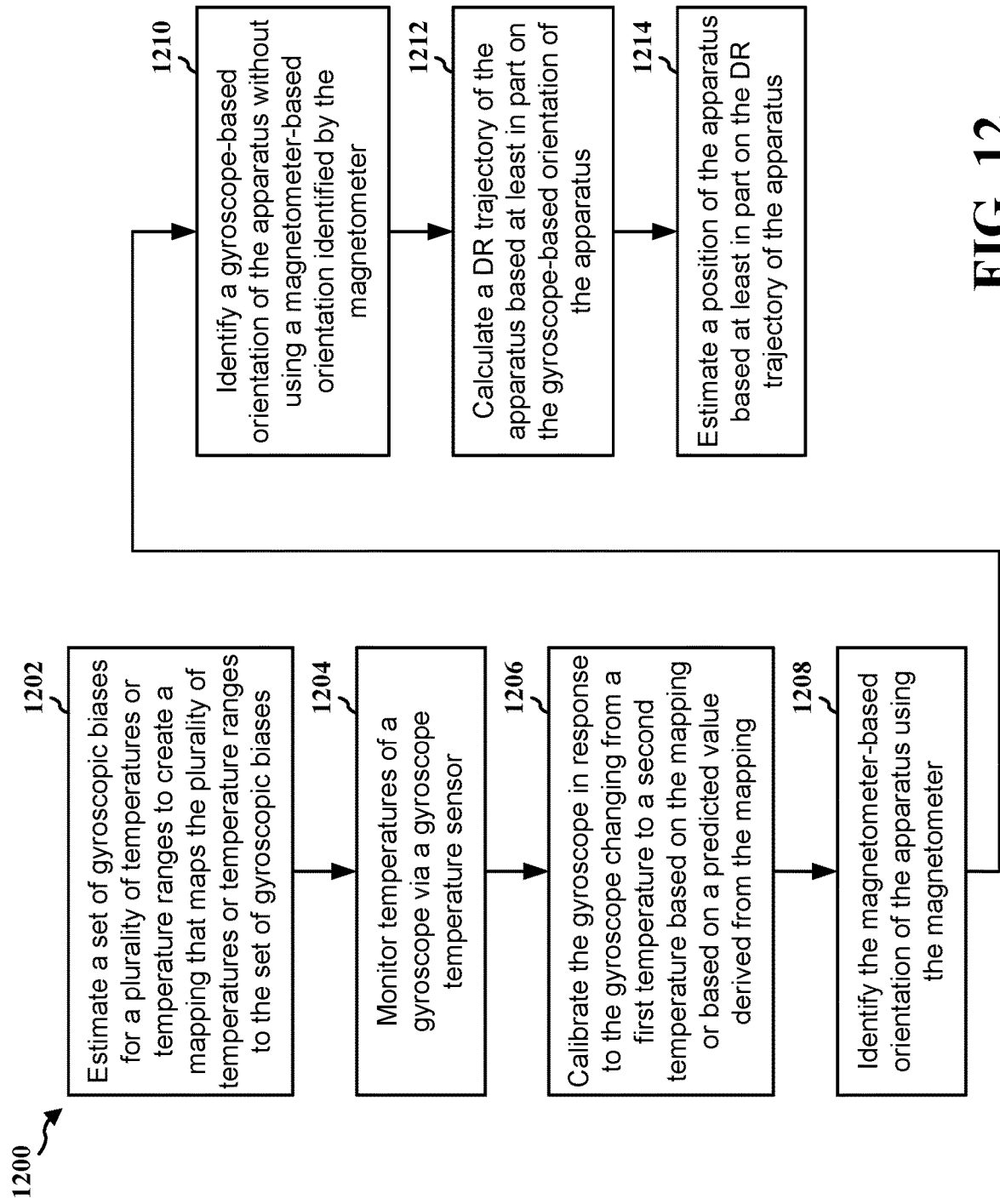
FIG. 12 is a flowchart of a method of wireless communication in accordance with aspects presented herein.

FIG. 12 is a flowchart 1200 of a method of DR trajectory generation. The method may be performed by an apparatus or a component of an apparatus (e.g., the UE 104, 350; the electronic device 402, 502; the apparatus 1402; a processing system, which may include the memory 360 and which may be the entire UE 350 or a component of the UE 350, such as the TX processor 368, the RX processor 356, and/or the controller/processor 359). The method may enable the apparatus to generate DR trajectories with or without using a magnetometer (or magnetometer-based orientation generated from a magnetometer).

At 1202, the apparatus may estimate a set of gyroscopic biases for a plurality of temperatures or temperature ranges to create a mapping that maps the plurality of temperatures or temperature ranges to the set of gyroscopic biases, such as described in connection with FIGS. 5, 6, and 8. For example, the electronic device 502 may estimate gyro biases at different gyroscope temperatures, and then the electronic device 502 may map an estimated gyro bias to each of multiple temperatures or temperature ranges. The estimation of the gyro biases and/or the creation of the mapping may be performed by, e.g., the gyro bias learning component 1440, the gyroscope 1415, and/or the gyro temperature sensor 1419 of the apparatus 1402 in FIG. 14.

At 1204, the apparatus may monitor temperatures of a gyroscope via a gyroscope temperature sensor, such as described in connection with FIGS. 5 and 6. For example, the electronic device 502 may monitor the temperatures of the gyroscope 506 via the gyro temperature sensor 508. The monitor of the temperatures of a gyroscope may be performed by, e.g., the gyro temperature monitor component 1442 and/or the gyro temperature sensor 1419 of the apparatus 1402 in FIG. 14.

At 1206, the apparatus may calibrate the gyroscope in response to the gyroscope changing from a first temperature to a second temperature based on the mapping or based on a predicted value derived from the mapping, such as described in connection with FIG. 5. For example, electronic device 502 may calibrate the gyroscope 506 if the electronic device 502 detects that there is a change in temperature of the gyroscope 506 based on the gyro biases learned or based on a predicted value derived from learned gyro biases. The calibration of the gyroscope may be performed by, e.g., the gyro calibration component 1444 and/or the gyroscope 1415 of the apparatus 1402 in FIG. 14.

At 1208, the apparatus may identify (or determine) the magnetometer-based orientation of the apparatus using the magnetometer, such as described in connection with FIG. 5. For example, if the electronic device 502 includes a magnetometer 514, the electronic device 502 may identify a magnetometer-based orientation of the apparatus using the magnetometer (e.g., such as for identifying the orientation of a screen/user interface). The identification of the magnetometer-based orientation of the apparatus may be performed by, e.g., the magnetometer-based orientation determination component 1448 and/or the magnetometer 1417 of the apparatus 1402 in FIG. 14. In one example, the magnetometer-based orientation may be used for a user interface orientation.

At 1210, the apparatus may identify (or determine) a gyroscope-based orientation of the apparatus without using a magnetometer-based orientation identified by the magnetometer, such as described in connection with FIG. 5. For example, electronic device 502 may identify a gyroscope-based orientation of the apparatus without a magnetometer. The identification of the gyroscope-based orientation of the apparatus may be performed by, e.g., the gyro-based orientation determination component 1450 and/or the accelerometer 1413 of the apparatus 1402 in FIG. 14.

In one example, the gyroscope-based orientation of the apparatus may be identified based on one or more of an accelerometer, a camera, or a sensor having a capability to determine an angular displacement on the apparatus.

In another example, the magnetometer-based orientation may not be used for calculating the DR trajectory whenever the gyroscope is calibrated and the magnetometer-based orientation may be used at least in part for calculating the DR trajectory if the gyroscope is not calibrated.

In another example, the magnetometer-based orientation may not be used for calculating the DR trajectory whenever there is a field interference greater than a threshold.

In another example, the magnetometer-based orientation may not be used for calculating the DR trajectory if the DR trajectory is calculated for a pedestrian.

In another example, the magnetometer-based orientation may not be used for calculating the DR trajectory if the apparatus is in an indoor environment.

In another example, the magnetometer-based orientation may not be used for calculating the DR trajectory if the DR trajectory is calculated for a vehicle.

At 1212, the apparatus may calculate a DR trajectory of the apparatus based at least in part on the calibrated gyroscope and an accelerometer, such as described in connection with FIG. 5. For example, the electronic device 502 may calculate a DR trajectory of the electronic device 502 using the accelerometer 504 and the gyroscope 506. The calculation of the DR trajectory may be performed by, e.g., the DR trajectory generation component 1446, the gyroscope 1415, and/or the accelerometer 1413 of the apparatus 1402 in FIG. 14.

At 1214, the apparatus may estimate a position of the apparatus based at least in part on the DR trajectory of the apparatus, such as described in connection with FIG. 5. For example, electronic device 502 may estimate a position of the electronic device 502 based on the DR trajectory calculated. The estimation of the position may be performed by, e.g., the position estimation component 1452 of the apparatus 1402 in FIG. 14.

Figure 13:
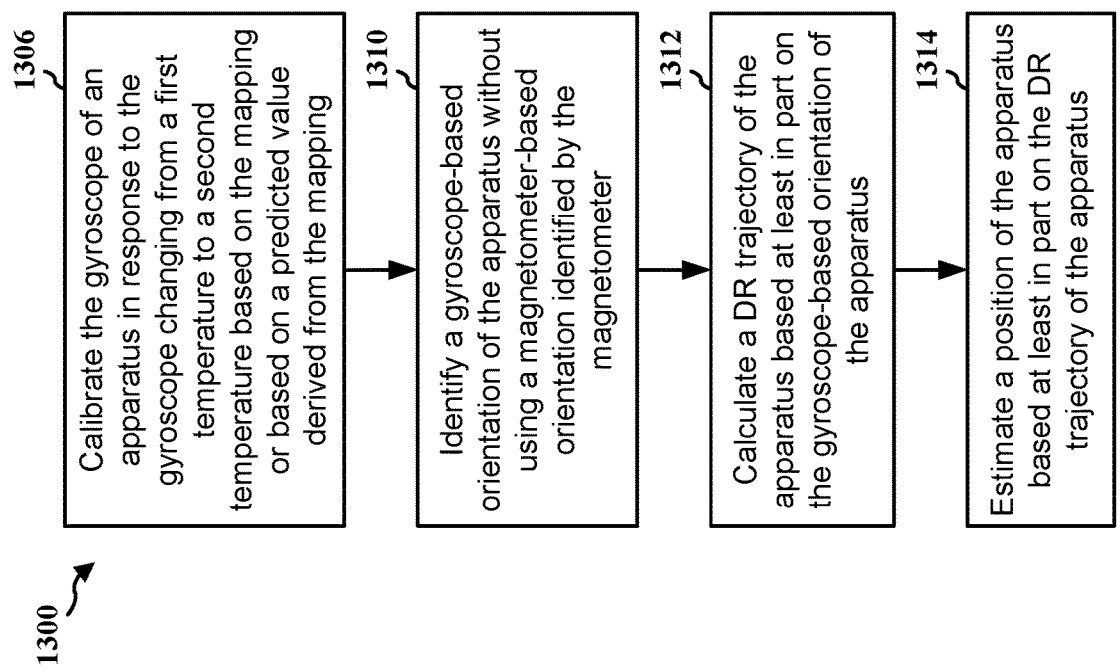
FIG. 13 is a flowchart of a method of wireless communication in accordance with aspects presented herein.

FIG. 13 is a flowchart 1300 of a method of DR trajectory generation. The method may be performed by an apparatus or a component of an apparatus (e.g., the UE 104, 350; the electronic device 402, 502; the apparatus 1402; a processing system, which may include the memory 360 and which may be the entire UE 350 or a component of the UE 350, such as the TX processor 368, the RX processor 356, and/or the controller/processor 359). The method may enable the apparatus to generate DR trajectories with or without using a magnetometer.

At 1306, the apparatus may calibrate the gyroscope in response to the gyroscope changing from a first temperature to a second temperature based on the mapping or based on a predicted value derived from the mapping, such as described in connection with FIG. 5. For example, electronic device 502 may calibrate the gyroscope 506 if the electronic device 502 detects that there is a change in temperature of the gyroscope 506 based on the gyro biases learned or based on a predicted value derived from learned gyro biases. The calibration of the gyroscope may be performed by, e.g., the gyro calibration component 1444 and/or the gyroscope 1415 of the apparatus 1402 in FIG. 14.

In one example, the apparatus may estimate a set of gyroscopic biases for a plurality of temperatures or temperature ranges to create a mapping that maps the plurality of temperatures or temperature ranges to the set of gyroscopic biases, such as described in connection with FIGS. 5, 6, and 8. For example, the electronic device 502 may estimate gyro biases at different gyroscope temperatures, and then the electronic device 502 may map an estimated gyro bias to each of multiple temperatures or temperature ranges. The estimation of the gyro biases and/or the creation of the mapping may be performed by, e.g., the gyro bias learning component 1440, the gyroscope 1415, and/or the gyro temperature sensor 1419 of the apparatus 1402 in FIG. 14.

In another example, the apparatus may monitor temperatures of a gyroscope via a gyroscope temperature sensor, such as described in connection with FIGS. 5 and 6. For example, the electronic device 502 may monitor the temperatures of the gyroscope 506 via the gyro temperature sensor 508. The monitor of the temperatures of a gyroscope may be performed by, e.g., the gyro temperature monitor component 1442 and/or the gyro temperature sensor 1419 of the apparatus 1402 in FIG. 14.

In another example, the apparatus may identify (or determine) the magnetometer-based orientation of the apparatus using the magnetometer, such as described in connection with FIG. 5. For example, if the electronic device 502 includes a magnetometer 514, the electronic device 502 may identify a magnetometer-based orientation of the apparatus using the magnetometer (e.g., such as for identifying the orientation of a screen/user interface). The identification of the magnetometer-based orientation of the apparatus may be performed by, e.g., the magnetometer-based orientation determination component 1448 and/or the magnetometer 1417 of the apparatus 1402 in FIG. 14. In one example, the magnetometer-based orientation may be used for a user interface orientation.

At 1310, the apparatus may identify (or determine) a gyroscope-based orientation of the apparatus without using a magnetometer-based orientation identified by the magnetometer, such as described in connection with FIG. 5. For example, electronic device 502 may identify a gyroscope-based orientation of the apparatus without a magnetometer. The identification of the gyroscope-based orientation of the apparatus may be performed by, e.g., the gyro-based orientation determination component 1450 and/or the accelerometer 1413 of the apparatus 1402 in FIG. 14.

In one example, the gyroscope-based orientation of the apparatus may be identified based on one or more of an accelerometer, a camera, or a sensor having a capability to determine an angular displacement on the apparatus.

In another example, the magnetometer-based orientation may not be used for calculating the DR trajectory whenever the gyroscope is calibrated and the magnetometer-based orientation may be used at least in part for calculating the DR trajectory if the gyroscope is not calibrated.

In another example, the magnetometer-based orientation may not be used for calculating the DR trajectory whenever there is a field interference greater than a threshold.

In another example, the magnetometer-based orientation may not be used for calculating the DR trajectory if the DR trajectory is calculated for a pedestrian.

In another example, the magnetometer-based orientation may not be used for calculating the DR trajectory if the apparatus is in an indoor environment.

In another example, the magnetometer-based orientation may not be used for calculating the DR trajectory if the DR trajectory is calculated for a vehicle.

At 1312, the apparatus may calculate a DR trajectory of the apparatus based at least in part on the calibrated gyroscope and an accelerometer, such as described in connection with FIG. 5. For example, the electronic device 502 may calculate a DR trajectory of the electronic device 502 using the accelerometer 504 and the gyroscope 506. The calculation of the DR trajectory may be performed by, e.g., the DR trajectory generation component 1446, the gyroscope 1415, and/or the accelerometer 1413 of the apparatus 1402 in FIG. 14.

At 1314, the apparatus may estimate a position of the apparatus based at least in part on the DR trajectory of the apparatus, such as described in connection with FIG. 5. For example, electronic device 502 may estimate a position of the electronic device 502 based on the DR trajectory calculated. The estimation of the position may be performed by, e.g., the position estimation component 1452 of the apparatus 1402 in FIG. 14.

Figure 14:
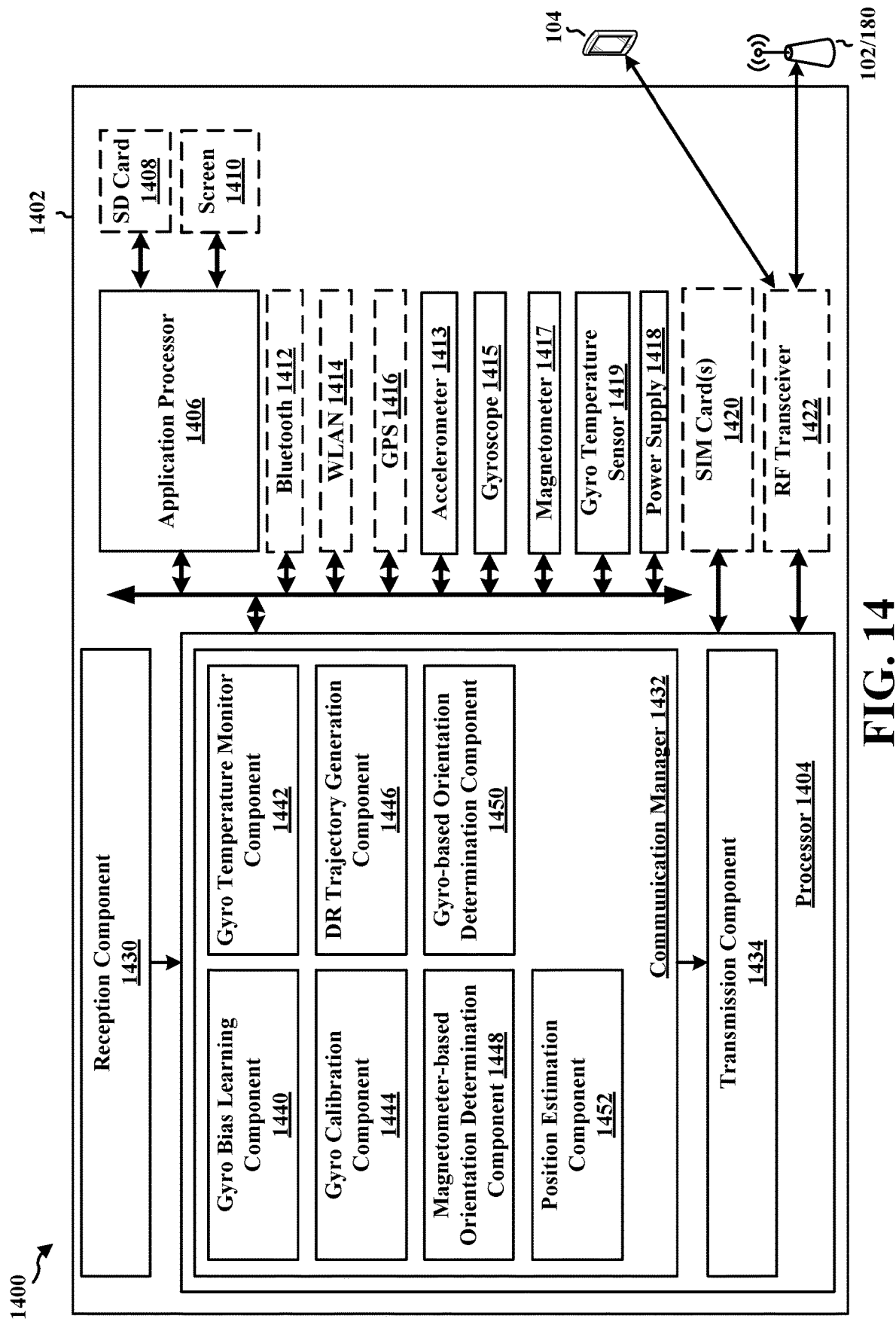
FIG. 14 is a diagram illustrating an example of a hardware implementation for an example apparatus in accordance with aspects presented herein.

FIG. 14 is a diagram 1400 illustrating an example of a hardware implementation for an apparatus 1402. In some examples, the apparatus 1402 may be a UE, a component of a UE, or may implement UE functionality. In other examples, the apparatus 1402 may be an electronic device (e.g., a pedestrian wearable device) capable of generating DR trajectories, a component of electronic device capable of generating DR trajectories, or may implement DR trajectory generation functionality. In some aspects, the apparatus 1402 may include a processor 1404 (which may be referred to as a modem in some examples) coupled to an RF transceiver 1422. In some aspects, the apparatus 1402 may further include one or more subscriber identity modules (SIM) cards 1420, an application processor 1406 coupled to a secure digital (SD) card 1408 and a screen 1410, a Bluetooth module 1412, a wireless local area network (WLAN) module 1414, a Global Positioning System (GPS) module 1416, accelerometer 1413, a gyroscope 1415, a gyro temperature sensor 1419 thermally coupled to the gyroscope 1415, a magnetometer 1417, or a power supply 1418. The processor 1404 communicates through the RF transceiver 1422 with the UE 104 and/or BS 102/180. The processor 1404 may include a computer-readable medium/memory. The computer-readable medium/memory may be non-transitory. The processor 1404 is responsible for general processing, including the execution of software stored on the computer-readable medium/memory. The software, when executed by the processor 1404, causes the processor 1404 to perform the various functions described supra. The computer-readable medium/memory may also be used for storing data that is manipulated by the processor 1404 when executing software. The processor 1404 further includes a reception component 1430, a communication manager 1432, and a transmission component 1434. The communication manager 1432 includes the one or more illustrated components. The components within the communication manager 1432 may be stored in the computer-readable medium/ memory and/or configured as hardware within the processor 1404. The processor 1404 may be a component of the UE 350 and may include the memory 360 and/or at least one of the TX processor 368, the RX processor 356, and the controller/processor 359. In one configuration, the apparatus 1402 may be a modem chip and include just the processor 1404, and in another configuration, the apparatus 1402 may be the entire UE (e.g., see 350 of FIG. 3) and include the additional modules of the apparatus 1402. In another configuration, the apparatus 1402 may be pedestrian wearable device and include just the processor 1404, the accelerometer 1413, the gyroscope 1415 and the gyro temperature sensor 1419.

The communication manager 1432 includes a gyro bias learning component 1440 that is configured to estimate a set of gyroscopic biases for a plurality of temperatures or temperature ranges to create a mapping that maps the plurality of temperatures or temperature ranges to the set of gyroscopic biases, e.g., as described in connection with 1202 of FIG. 12. The communication manager 1432 further includes a gyro temperature monitor component 1442 that is configured to monitor the temperatures of the gyroscope via the gyroscope temperature sensor, e.g., as described in connection with 1204 of FIG. 12. The communication manager 1432 further includes a gyro calibration component 1444 that is configured to calibrate the gyroscope in response to the gyroscope changing from a first temperature to a second temperature based on the mapping or based on a predicted value derived from the mapping, e.g., as described in connection with 1206 of FIG. 12 and/or 1306 of FIG. 13. The communication manager 1432 further includes a magnetometer-based orientation determination component 1448 that is configured to identify the magnetometer-based orientation of the apparatus using the magnetometer, e.g., as described in connection with 1208 of FIG. 12. The communication manager 1432 further includes a gyro-based orientation determination component 1450 that is configured to identify a gyroscope-based orientation of the apparatus without using a magnetometer-based orientation identified by the magnetometer, e.g., as described in connection with 1210 of FIG. 12 and/or 1310 of FIG. 13. The communication manager 1432 further includes a DR trajectory generation component 1446 that is configured to calculate a DR trajectory of the apparatus based at least in part on the calibrated gyroscope and the accelerometer, e.g., as described in connection with 1212 of FIG. 12 and/or 1312 of FIG. 13. The communication manager 1432 further includes a position estimation component 1452 that is configured to estimate a position of the apparatus based at least in part on the DR trajectory of the apparatus, e.g., as described in connection with 1214 of FIG. 12 and/or 1314 of FIG. 13.

The apparatus may include additional components that perform each of the blocks of the algorithm in the flowcharts of FIGS. 12 and 13. As such, each block in the flowcharts of FIGS. 12 and 13 may be performed by a component and the apparatus may include one or more of those components. The components may be one or more hardware components specifically configured to carry out the stated processes/ algorithm, implemented by a processor configured to perform the stated processes/algorithm, stored within a computer-readable medium for implementation by a processor, or some combination thereof.

As shown, the apparatus 1402 may include a variety of components configured for various functions. In one configuration, the apparatus 1402, and in particular the processor 1404, includes means for estimating a set of gyroscopic biases for a plurality of temperatures or temperature ranges to create a mapping that maps the plurality of temperatures or temperature ranges to the set of gyroscopic biases (e.g., the gyro bias learning component 1440, the gyroscope 1415, and/or the gyro temperature sensor 1419). The apparatus 1402 includes means for monitoring the temperatures of the gyroscope via the gyroscope temperature sensor (e.g., the gyro temperature monitor component 1442 and/or the gyro temperature sensor 1419). The apparatus 1402 includes means for calibrating the gyroscope in response to the gyroscope changing from a first temperature to a second temperature based on the mapping or based on a predicted value derived from the mapping (e.g., the gyro calibration component 1444 and/or the gyroscope 1415). The apparatus 1402 includes means for identifying the magnetometer-based orientation of the apparatus using the magnetometer (e.g., the magnetometer-based orientation determination component 1448 and/or the magnetometer 1417). The apparatus 1402 includes means for identifying a gyroscope-based orientation of the apparatus without using a magnetometer-based orientation identified by the magnetometer (e.g., the gyro-based orientation determination component 1450 and/ or the accelerometer 1413). The apparatus 1402 includes means for calculating a DR trajectory of the apparatus based at least in part on the calibrated gyroscope and the accelerometer (e.g., the DR trajectory generation component 1446, the gyroscope 1415, and/or the accelerometer 1413). The apparatus 1402 includes means for estimating a position of the apparatus based at least in part on the DR trajectory of the apparatus (e.g., the position estimation component 1452).

In one configuration, the magnetometer-based orientation may be used for a user interface orientation.

In one configuration, the gyroscope-based orientation of the apparatus may be identified based on one or more of an accelerometer, a camera, or a sensor having a capability to determine an angular displacement on the apparatus.

In another configuration, the magnetometer-based orientation may not be used for calculating the DR trajectory whenever the gyroscope is calibrated and the magnetometer-based orientation may be used at least in part for calculating the DR trajectory if the gyroscope is not calibrated.

In another configuration, the magnetometer-based orientation may not be used for calculating the DR trajectory whenever there is a field interference greater than a threshold.

In another configuration, the magnetometer-based orientation may not be used for calculating the DR trajectory if the DR trajectory is calculated for a pedestrian.

In another configuration, the magnetometer-based orientation may not be used for calculating the DR trajectory if the apparatus is in an indoor environment.

In another configuration, the magnetometer-based orientation may not be used for calculating the DR trajectory if the DR trajectory is calculated for a vehicle.

The means may be one or more of the components of the apparatus 1402 configured to perform the functions recited by the means. As described supra, the apparatus 1402 may include the TX Processor 368, the RX Processor 356, and the controller/processor 359. As such, in one configuration, the means may be the TX Processor 368, the RX Processor 356, and the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus including a gyroscope for determining a rotational position of the apparatus; a gyroscope temperature sensor coupled to the gyroscope for measuring temperatures of the gyroscope; a memory; and at least one processor coupled at least to the memory and is configured to: estimate a set of gyroscopic biases for a plurality of temperatures or temperature ranges to create a mapping that maps the plurality of temperatures or temperature ranges to the set of gyroscopic biases; monitor the temperatures of the gyroscope via the gyroscope temperature sensor; and calibrate the gyroscope in response to the gyroscope changing from a first temperature to a second temperature based on the mapping or based on a predicted value derived from the mapping.

Aspect 2 is the apparatus of aspect 1, where if the apparatus does not include a magnetometer, the set of gyroscopic biases are estimated when the apparatus is stationary.

Aspect 3 is the apparatus of any of aspects 1 and 2, where the gyroscope is calibrated when the apparatus is stationary and the gyroscope is not calibrated when the apparatus is not stationary.

Aspect 4 is the apparatus of any of aspects 1 to 3, where to calibrate the gyroscope, the at least one processor is further configured to: refrain from receiving an input from a magnetometer to calibrate the gyroscope.

Aspect 5 is the apparatus of any of aspects 1 to 4, further includes a magnetometer coupled to the gyroscope, where the at least one processor is further configured to: calibrate the gyroscope based at least in part on the magnetometer if the gyroscope is not calibrated based on the mapping at the second temperature; and refrain from calibrating the gyroscope based at least in part on the magnetometer if the gyroscope is calibrated based on the mapping at the second temperature.

Aspect 6 is the apparatus of any of aspects 1 to 5, further includes a magnetometer coupled to the gyroscope, where the at least one processor is further configured to: calibrate the gyroscope based at least in part on the magnetometer in response to a measured magnetic field disturbance that is less than a disturbance threshold; and refrain from calibrating the gyroscope based on the magnetometer if the measured magnetic field disturbance is greater than the disturbance threshold.

Aspect 7 is the apparatus of any of aspects 1 to 6, where the at least one processor is further configured to: calibrate the gyroscope further based on the gyroscope being at an uncalibrated temperature or a difference between the first temperature and the second temperature being greater than a temperature threshold.

Aspect 8 is the apparatus of any of aspects 1 to 7, where the at least one processor is further configured to: calibrate the gyroscope further based on a gyroscopic bias value for the second temperature in the mapping being different from a stored compensation factor for the second temperature by a compensation threshold; and update the stored compensation factor for the second temperature based on the gyroscopic bias value for the second temperature in the mapping.

Aspect 9 is the apparatus of any of aspects 1 to 8, where the mapping maps each of the plurality of temperatures or temperature ranges to a gyroscopic bias value in the set of gyroscopic biases.

Aspect 10 is the apparatus of any of aspects 1 to 9, where to estimate the set of gyroscopic biases for the plurality of temperatures or temperature ranges to create the mapping that maps the plurality of temperatures or temperature ranges to the set of gyroscopic biases, the at least one processor is further configured to: estimate a gyroscopic bias for each of the plurality of temperatures or temperature ranges; record the estimated gyroscopic bias to the mapping based on the estimated gyroscopic bias not exceeding a bias noise threshold; and exclude the estimated gyroscopic bias from the mapping based on the estimated gyroscopic bias exceeding the bias noise threshold.

Aspect 11 is the apparatus of any of aspects 1 to 10, where the mapping does not include a gyroscopic bias value corresponding to the second temperature, the at least one processor being further configured to: derive the predicted value based on a curve fit predicated based on multiple gyroscopic bias values in the mapping, based on an adjacent temperature of the second temperature available in the mapping, or based on a linear relationship between two temperatures or temperature ranges in the mapping; and calibrate the gyroscope in response to the gyroscope changing from the first temperature to the second temperature based on the predicted value.

Aspect 12 is the apparatus of any of aspects 1 to 11, further includes an accelerometer coupled to the gyroscope, where the at least one processor is further configured to: calculate a DR trajectory of the apparatus based at least in part on the calibrated gyroscope and the accelerometer.

Aspect 13 is the apparatus of any of aspects 1 to 12, where the DR trajectory is calculated without using a magnetometer or without using data generated from the magnetometer.

Aspect 14 is the apparatus of any of aspects 1 to 13, where the apparatus includes one or more of: a pedestrian UE, an AR device, a VR device, a device associated with an automotive application, a wireless device, or an IoT device.

Aspect 15 is the apparatus of any of aspects 1 to 14, where to estimate the set of gyroscopic biases for the plurality of temperatures or temperature ranges to create the mapping, the at least one processor is further configured to: sample the temperatures of the gyroscope at multiple intervals; estimate a gyroscopic bias for a sampled temperature at each of the multiple intervals based on the gyroscopic bias for the sampled temperature not existing in the mapping and the apparatus being stationary; apply the gyroscopic bias for the sampled temperature to the mapping; and refrain from estimating the gyroscopic bias for the sampled temperature if another gyroscopic bias of the sampled temperature exists in the mapping or if multiple gyroscopic bias estimations at the sampled temperature indicate a discrepancy.

Aspect 16 is the apparatus of any of aspects 1 to 15, where to estimate the gyroscopic bias for the sampled temperature, the at least one processor is further configured to: stream sensor data for a fixed duration.

Aspect 17 is the apparatus of any of aspects 1 to 16, further includes a transceiver communicatively coupled to the at least one processor.

Aspect 18 is a method of wireless communication for implementing any of aspects 1 to 17.

Aspect 19 is an apparatus for wireless communication including means for implementing any of aspects 1 to 17.

Aspect 20 is a computer-readable medium storing computer executable code, where the code when executed by a processor causes the processor to implement any of aspects 1 to 17.

Aspect 21 is an apparatus including a gyroscope for determining a rotational position of the apparatus; a gyroscope temperature sensor for measuring temperatures of the gyroscope; a magnetometer; a memory; and at least one processor, communicatively coupled at least to the gyroscope, the magnetometer and the memory, the at least one processor configured to: calibrate the gyroscope in response to the gyroscope changing from a first temperature to a second temperature based on a mapping or based on a predicted value derived from the mapping; identify a gyroscope-based orientation of the apparatus without using a magnetometer-based orientation identified by the magnetometer; calculate a DR trajectory of the apparatus based at least in part on the gyroscope-based orientation of the apparatus; and estimate a position of the apparatus based at least in part on the DR trajectory of the apparatus.

Aspect 22 is the apparatus of aspect 21, where the at least one processor is further configured to: estimate a set of gyroscopic biases for a plurality of temperatures or temperature ranges to create the mapping that maps the plurality of temperatures or temperature ranges to the set of gyroscopic biases; and monitor the temperatures of the gyroscope via the gyroscope temperature sensor.

Aspect 23 is the apparatus of any of aspects 21 and 22, where the at least one processor is further configured to: identify the magnetometer-based orientation of the apparatus using the magnetometer.

Aspect 24 is the apparatus of any of aspects 21 to 23, where the magnetometer-based orientation is not used for calculating the DR trajectory whenever the gyroscope is calibrated and the magnetometer-based orientation is used at least in part for calculating the DR trajectory if the gyroscope is not calibrated.

Aspect 25 is the apparatus of any of aspects 21 to 24, where the magnetometer-based orientation is not used for calculating the DR trajectory whenever there is a field interference greater than a threshold.

Aspect 26 is the apparatus of any of aspects 21 to 25, where the magnetometer-based orientation is not used for calculating the DR trajectory if the DR trajectory is calculated for a pedestrian.

Aspect 27 is the apparatus of any of aspects 21 to 26, where the magnetometer-based orientation is not used for calculating the DR trajectory if the apparatus is in an indoor environment.

Aspect 28 is the apparatus of any of aspects 1 to 27, where the magnetometer-based orientation is not used for calculating the DR trajectory if the DR trajectory is calculated for a vehicle.

Aspect 29 is the apparatus of any of aspects 21 to 28, where the magnetometer-based orientation is used for a user interface orientation.

Aspect 30 is the apparatus of any of aspects 21 to 29, where the gyroscope-based orientation of the apparatus is identified based on one or more of an accelerometer, a camera, or a sensor having a capability to determine an angular displacement on the apparatus.

Aspect 31 is the apparatus of any of aspects 21 to 30, further includes a transceiver coupled to the at least one processor.

Aspect 32 is a method of wireless communication for implementing any of aspects 21 to 31.

Aspect 33 is an apparatus for wireless communication including means for implementing any of aspects 21 to 31.

Aspect 34 is a computer-readable medium storing computer executable code, where the code when executed by a processor causes the processor to implement any of aspects 21 to 31.

What is claimed is:

1. An apparatus, comprising:
a gyroscope for determining a rotational position of the apparatus;
a gyroscope temperature sensor for measuring temperatures of the gyroscope;
memory; and
at least one processor, communicatively coupled at least to the memory, and configured to:
estimate a set of gyroscopic biases for a plurality of temperatures or temperature ranges to create a mapping that maps the plurality of temperatures or the temperature ranges to the set of gyroscopic biases;
monitor the temperatures of the gyroscope via the gyroscope temperature sensor;
calibrate the gyroscope in response to the gyroscope changing from a first temperature to a second temperature based on the mapping or based on a predicted value derived from the mapping;
identify a gyroscope-based orientation based on the calibrated gyroscope without using a magnetometer-based orientation identified by a magnetometer; and
calculate a dead reckoning (DR) trajectory of the apparatus based on the gyroscope-based orientation of the apparatus, wherein the magnetometer-based orientation is not used for calculating the DR trajectory if the gyroscope is calibrated and the magnetometer-based orientation is used for calculating the DR trajectory if the gyroscope is not calibrated.

2. The apparatus of claim 1, wherein the gyroscope is calibrated when the apparatus is not stationary based at least in part on one or more of: an accelerometer, a camera, or a sensor having a capability to determine an angular displacement.

3. The apparatus of claim 1, wherein the gyroscope is calibrated when the apparatus is stationary and the gyroscope is not calibrated when the apparatus is not stationary.

4. The apparatus of claim 1, wherein to calibrate the gyroscope, the at least one processor is further configured to:
refrain from receiving an input from the magnetometer to calibrate the gyroscope.

5. The apparatus of claim 1, wherein the at least one processor is further configured to:
calibrate the gyroscope based at least in part on the magnetometer if the gyroscope is not calibrated based on the mapping at the second temperature; and
refrain from calibrating the gyroscope based at least in part on the magnetometer if the gyroscope is calibrated based on the mapping at the second temperature.

6. The apparatus of claim 1, wherein the at least one processor is further configured to:
calibrate the gyroscope based at least in part on the magnetometer in response to a measured magnetic field disturbance that is less than a disturbance threshold; and
refrain from calibrating the gyroscope based on the magnetometer if the measured magnetic field disturbance is greater than the disturbance threshold.

7. The apparatus of claim 1, wherein the at least one processor is further configured to:
calibrate the gyroscope further based on the gyroscope being at an uncalibrated temperature or a difference between the first temperature and the second temperature being greater than a temperature threshold.

8. The apparatus of claim 1, wherein the gyroscope is calibrated based on a background calibration.

9. The apparatus of claim 1, wherein the at least one processor is further configured to:
calibrate the gyroscope further based on a gyroscopic bias value for the second temperature in the mapping being different from a stored compensation factor for the second temperature by a compensation threshold; and
update the stored compensation factor for the second temperature based on the gyroscopic bias value for the second temperature in the mapping.

10. The apparatus of claim 1, wherein the mapping maps each of the plurality of temperatures or the temperature ranges to a gyroscopic bias value in the set of gyroscopic biases.

11. The apparatus of claim 1, wherein the mapping does not include a gyroscopic bias value corresponding to the second temperature, the at least one processor being further configured to:
derive the predicted value based on a curve fit predicated based on multiple gyroscopic bias values in the mapping, based on an adjacent temperature of the second temperature available in the mapping, or based on a linear relationship between two temperatures or the temperature ranges in the mapping; and
calibrate the gyroscope in response to the gyroscope changing from the first temperature to the second temperature based on the predicted value.

12. The apparatus of claim 1, further comprising an accelerometer coupled to the gyroscope, wherein to calculate the DR trajectory of the apparatus based on the gyroscope-based orientation of the apparatus, the at least one processor is further configured to:
calculate the DR trajectory of the apparatus based at least in part on the calibrated gyroscope and the accelerometer.

13. The apparatus of claim 12, wherein the DR trajectory is calculated without using the magnetometer or without using data generated from the magnetometer.

14. The apparatus of claim 1, wherein the apparatus includes one or more of: a pedestrian user equipment (UE), an augmented reality (AR) device, a virtual reality (VR) device, a device associated with an automotive application, a device or a component that is part of an automobile, a wireless device, or an Internet of Things (IoT) device.

15. The apparatus of claim 1, wherein to estimate the set of gyroscopic biases for the plurality of temperatures or the temperature ranges to create the mapping, the at least one processor is further configured to:
sample the temperatures of the gyroscope at multiple intervals;
estimate a gyroscopic bias for a sampled temperature at each of the multiple intervals based on the gyroscopic bias for the sampled temperature not existing in the mapping and the apparatus being stationary;
apply the gyroscopic bias for the sampled temperature to the mapping; and
refrain from estimating the gyroscopic bias for the sampled temperature if another gyroscopic bias of the sampled temperature exists in the mapping or if multiple gyroscopic bias estimations at the sampled temperature indicate a discrepancy.

16. The apparatus of claim 15, wherein to estimate the gyroscopic bias for the sampled temperature, the at least one processor is further configured to:
stream sensor data for a fixed duration.

17. The apparatus of claim 1, further comprising a transceiver communicatively coupled to the at least one processor.

18. The apparatus of claim 1, wherein to estimate the set of gyroscopic biases for the plurality of temperatures or the temperature ranges to create the mapping that maps the plurality of temperatures or the temperature ranges to the set of gyroscopic biases, the at least one processor is configured to:
estimate a gyroscopic bias for each of the plurality of temperatures or the temperature ranges;
record the estimated gyroscopic bias to the mapping based on the estimated gyroscopic bias not exceeding a bias noise threshold; and
exclude the estimated gyroscopic bias from the mapping based on the estimated gyroscopic bias exceeding the bias noise threshold.

19. A method, comprising:
estimating a set of gyroscopic biases for a plurality of temperatures or temperature ranges to create a mapping that maps the plurality of temperatures or the temperature ranges to the set of gyroscopic biases;
monitoring temperatures of a gyroscope via a gyroscope temperature sensor;
calibrating the gyroscope in response to the gyroscope changing from a first temperature to a second temperature based on the mapping or based on a predicted value derived from the mapping;
identifying a gyroscope-based orientation based on the calibrated gyroscope without using a magnetometer-based orientation identified by a magnetometer; and
calculating a dead reckoning (DR) trajectory of an electronic device based on the gyroscope-based orientation of the electronic device, wherein the magnetometer-based orientation is not used for calculating the DR trajectory if the gyroscope is calibrated and the magnetometer-based orientation is used for calculating the DR trajectory if the gyroscope is not calibrated.

20. The method of claim 19, further comprising:
refraining from receiving an input from the magnetometer to calibrate the gyroscope.

21. The method of claim 19, further comprising the magnetometer coupled to the gyroscope, the method comprises:
calibrating the gyroscope based at least in part on the magnetometer if the gyroscope is not calibrated based on the mapping at the second temperature; and
refraining from calibrating the gyroscope based at least in part on the magnetometer if the gyroscope is calibrated based on the mapping at the second temperature.

22. The method of claim 19, further comprising the magnetometer coupled to the gyroscope, the method comprises:
calibrating the gyroscope based at least in part on the magnetometer in response to a measured magnetic field disturbance that is less than a disturbance threshold; and
refraining from calibrating the gyroscope based on the magnetometer if the measured magnetic field disturbance is greater than the disturbance threshold.

23. The method of claim 19, further comprising:
calibrating the gyroscope further based on the gyroscope being at an uncalibrated temperature or a difference between the first temperature and the second temperature being greater than a temperature threshold.

24. The method of claim 19, wherein the gyroscope is calibrated based on a background calibration.

25. The method of claim 19, further comprising:
calibrating the gyroscope further based on a gyroscopic bias value for the second temperature in the mapping being different from a stored compensation factor for the second temperature by a compensation threshold; and
updating the stored compensation factor for the second temperature based on the gyroscopic bias value for the second temperature in the mapping.

26. The method of claim 19, wherein the mapping does not include a gyroscopic bias value corresponding to the second temperature, the method further comprises:
deriving the predicted value based on a curve associated with multiple gyroscopic bias values in the mapping, based on an adjacent temperature of the second temperature available in the mapping, or based on a linear relationship between two temperatures or the temperature ranges in the mapping; and
calibrating the gyroscope in response to the gyroscope changing from the first temperature to the second temperature based on the predicted value.

27. The method of claim 19, further comprising an accelerometer coupled to the gyroscope, wherein calculating the DR trajectory based at least in part on the gyroscope further comprises:
calculating the DR trajectory based at least in part on the gyroscope and the accelerometer, and wherein the DR trajectory is calculated without using the magnetometer or without using data generated from the magnetometer.

28. The method of claim 19, wherein estimating the set of gyroscopic biases for the plurality of temperatures or the temperature ranges to create the mapping that maps the plurality of temperatures or the temperature ranges to the set of gyroscopic biases, the method further comprising:
sampling the temperatures of the gyroscope at multiple intervals;
estimating a gyroscopic bias for a sampled temperature at each of the multiple intervals based on the gyroscopic bias for the sampled temperature not existing in the mapping and the gyroscope being stationary;
applying the gyroscopic bias for the sampled temperature to the mapping; and
refraining from estimating the gyroscopic bias for the sampled temperature if another gyroscopic bias of the sampled temperature exists in the mapping or if multiple gyroscopic bias estimations at the sampled temperature indicate a discrepancy.

29. The method of claim 28, further comprising:
streaming sensor data for a fixed duration.

30. The method of claim 19, wherein estimating the set of gyroscopic biases for the plurality of temperatures or the temperature ranges to create the mapping that maps the plurality of temperatures or the temperature ranges to the set of gyroscopic biases comprises:
estimating a gyroscopic bias for each of the plurality of temperatures or the temperature ranges;
recording the estimated gyroscopic bias to the mapping based on the estimated gyroscopic bias not exceeding a bias noise threshold; and
excluding the estimated gyroscopic bias from the mapping based on the estimated gyroscopic bias exceeding the bias noise threshold.

31. An apparatus, comprising:
a gyroscope for determining a rotational position of the apparatus;
a gyroscope temperature sensor for measuring temperatures of the gyroscope;
a magnetometer;
memory; and
at least one processor, communicatively coupled at least to the gyroscope, the magnetometer and the memory, the at least one processor configured to:
calibrate the gyroscope in response to the gyroscope changing from a first temperature to a second temperature based on a mapping or based on a predicted value derived from the mapping;
identify a gyroscope-based orientation of the apparatus without using a magnetometer-based orientation identified by the magnetometer;
calculate a dead reckoning (DR) trajectory of the apparatus based at least in part on the gyroscope-based orientation of the apparatus;
estimate a position of the apparatus based at least in part on the DR trajectory of the apparatus; and
identify the magnetometer-based orientation of the apparatus using the magnetometer, wherein the magnetometer-based orientation is not used for calculating the DR trajectory whenever the gyroscope is calibrated and the magnetometer-based orientation is used at least in part for calculating the DR trajectory if the gyroscope is not calibrated.

32. The apparatus of claim 31, wherein the at least one processor is further configured to:
estimate a set of gyroscopic biases for a plurality of temperatures or temperature ranges to create the mapping that maps the plurality of temperatures or the temperature ranges to the set of gyroscopic biases; and
monitor the temperatures of the gyroscope via the gyroscope temperature sensor.

33. The apparatus of claim 31, wherein the magnetometer-based orientation is not used for calculating the DR trajectory whenever there is a field interference greater than a threshold.

34. The apparatus of claim 31, wherein the magnetometer-based orientation is not used for calculating the DR trajectory if the DR trajectory is calculated for a pedestrian.

35. The apparatus of claim 31, wherein the magnetometer-based orientation is not used for calculating the DR trajectory if the apparatus is in an indoor environment.

36. The apparatus of claim 31, wherein the magnetometer-based orientation is not used for calculating the DR trajectory if the DR trajectory is calculated for a vehicle.

37. The apparatus of claim 31, wherein the magnetometer-based orientation is used for a user interface orientation.

38. The apparatus of claim 31, wherein the gyroscope-based orientation of the apparatus is identified based on one or more of an accelerometer, a camera, or a sensor having a capability to determine an angular displacement on the apparatus.

39. A method, comprising:
calibrating a gyroscope of an electronic device in response to the gyroscope changing from a first temperature to a second temperature based on a mapping or based on a predicted value derived from the mapping;
identifying a gyroscope-based orientation of the electronic device without using a magnetometer-based orientation identified by a magnetometer of the electronic device;
calculating a dead reckoning (DR) trajectory of the electronic device based at least in part on the gyroscope-based orientation of the electronic device;
estimating a position of the electronic device based at least in part on the DR trajectory of the electronic device; and
identifying the magnetometer-based orientation of the electronic device using the magnetometer, wherein the magnetometer-based orientation is not used for calculating the DR trajectory if the gyroscope is calibrated and the magnetometer-based orientation is used at least in part for calculating the DR trajectory if the gyroscope is not calibrated.

40. The method of claim 39, further comprising:
estimating a set of gyroscopic biases for a plurality of temperatures or temperature ranges to create the mapping that maps the plurality of temperatures or the temperature ranges to the set of gyroscopic biases; and
monitoring temperatures of the gyroscope via a gyroscope temperature sensor.

41. The method of claim 39, wherein the magnetometer-based orientation is not used for calculating the DR trajectory if there is a field interference greater than a threshold.

42. The method of claim 39, wherein the magnetometer-based orientation is not used for calculating the DR trajectory if the DR trajectory is calculated for a pedestrian.

43. The method of claim 39, wherein the magnetometer-based orientation is not used for calculating the DR trajectory if the method is in an indoor environment.

44. The method of claim 39, wherein the magnetometer-based orientation is not used for calculating the DR trajectory if the DR trajectory is calculated for a vehicle.

45. The method of claim 39, wherein the magnetometer-based orientation is used for a user interface orientation.

46. The method of claim 39, wherein the gyroscope-based orientation of the method is identified using one or more of an accelerometer, a camera, or a sensor having a capability to determine an angular displacement on the electronic device.

* * * * *